US012662601B2

(12) United States Patent
Mani et al.

(10) Patent No.: US 12,662,601 B2
(45) Date of Patent: Jun. 23, 2026

(54) CLEAR COATING ANTIMICROBIAL COMPOSITIONS, METHODS OF PREPARATION, AND USES THEREOF FOR CONFERRING ANTIMICROBIAL ACTIVITY TO A SURFACE

(71) Applicant: POLYAMYNA NANOTECH INC., St. John's (CA)

(72) Inventors: Ramesh Kumar Mani, St. John's (CA); Bala Kishan Gorityala, St. John's (CA)

(73) Assignee: POLYAMYNA NANOTECH INC., St. John's (CA)

( * ) Notice: Subject to any disclaimer, the term of this patent is extended or adjusted under 35 U.S.C. 154(b) by 345 days.

(21) Appl. No.: 18/255,187

(22) PCT Filed: Nov. 29, 2021

(86) PCT No.: PCT/IB2021/061079
§ 371 (c)(1),
(2) Date: May 31, 2023

(87) PCT Pub. No.: WO2022/118177
PCT Pub. Date: Jun. 9, 2022

(65) Prior Publication Data
US 2025/0346768 A1 Nov. 13, 2025

Related U.S. Application Data

(60) Provisional application No. 63/119,855, filed on Dec. 1, 2020.

(51) Int. Cl.
*C09D 5/14* (2006.01)
*C08K 5/19* (2006.01)
(Continued)

(52) U.S. Cl.
CPC .................. *C09D 5/14* (2013.01); *C08K 5/19* (2013.01); *C09D 7/20* (2018.01); *C09D 7/63* (2018.01); *C09D 7/65* (2018.01); *C09D 129/14* (2013.01)

(58) Field of Classification Search
CPC combination set(s) only.
See application file for complete search history.

(56) References Cited

U.S. PATENT DOCUMENTS

| | | | |
|---|---|---|---|
| 5,202,205 A | 4/1993 | Malhota | |
| 5,795,696 A | 8/1998 | Malhotra | |

(Continued)

FOREIGN PATENT DOCUMENTS

| | | |
|---|---|---|
| AU | 2011296133 B2 | 8/2011 |
| CA | 1222947 A | 6/1987 |

(Continued)

OTHER PUBLICATIONS

International Search Report and Written Opinion of PCT/IB2021/061079, mailed on Feb. 9, 2022, 12 pages.

(Continued)

*Primary Examiner* — Peter A Salamon
(74) *Attorney, Agent, or Firm* — Heslin Rothenberg Farley & Mesiti P.C.

(57) ABSTRACT

Described herein are clear coating antimicrobial compositions, methods of preparation, and uses thereof for conferring antimicrobial activity to a surface. One particular composition comprises at least one antimicrobial, a vinyl acetal derivative polymer binder and a solvent for solubilizing said at least one antimicrobial and said vinyl acetal derivative polymer binder. Another particular composition, comprises at least one antimicrobial and a binder polymer/solvent selected from an acrylic acid polymer, a polyester-based polymer, an epoxy-based polymer, and mixtures thereof.

24 Claims, 4 Drawing Sheets

(51) Int. Cl.

| | |
|---|---|
| *C09D 7/20* | (2018.01) |
| *C09D 7/63* | (2018.01) |
| *C09D 7/65* | (2018.01) |
| *C09D 129/14* | (2006.01) |

(56) References Cited

U.S. PATENT DOCUMENTS

| | | | |
|---|---|---|---|
| 6,162,839 | A | 12/2000 | Klauck et al. |
| 7,037,513 | B1 | 5/2006 | Traynor et al. |
| 2008/0317795 | A1 | 12/2008 | Traynor et al. |
| 2009/0123507 | A1 | 5/2009 | Ohrlein |
| 2010/0136073 | A1 | 6/2010 | Preuss et al. |
| 2010/0233146 | A1 | 9/2010 | Mcdaniel et al. |
| 2011/0014256 | A1 | 1/2011 | Chang et al. |
| 2012/0201902 | A1 | 8/2012 | Modak et al. |
| 2018/0000858 | A1* | 1/2018 | Liang ................. A61L 26/0019 |
| 2018/0028431 | A1* | 2/2018 | Chiattello ............... C09D 5/14 |
| 2018/0194128 | A1 | 7/2018 | Akhter et al. |
| 2018/0223011 | A1 | 8/2018 | Duan et al. |
| 2018/0311128 | A1 | 11/2018 | Copeland et al. |
| 2019/0133126 | A1 | 5/2019 | Modak et al. |
| 2020/0000693 | A1 | 1/2020 | Traynor et al. |

FOREIGN PATENT DOCUMENTS

| | | | |
|---|---|---|---|
| CA | 2588775 | A1 | 6/2006 |
| CA | 3031822 | A1 | 2/2018 |
| CN | 102772801 | A | 10/2014 |
| CN | 106075557 | A | 11/2016 |
| CN | 106563129 | A | 4/2017 |
| CN | 108685886 | A | 10/2018 |
| CN | 109177244 | A | 1/2019 |
| FR | 2152373 | A1 | 4/1973 |
| GB | 1498730 | A | 1/1978 |
| WO | 2016052401 | A1 | 4/2016 |
| WO | 2018148612 | A1 | 8/2018 |

OTHER PUBLICATIONS

Reilman, Ewound et al., "Towards an Antimicrobial Microglove" Scientific Reports, 5:16679, Nov. 13, 2015.

Zaninii, Stefano et. al., "Development of Antibacterial Quaternary Ammonium Silane Coatings on Polyurethane Catheters" Journal of Colloid and Interface Science, 451, pp. 78-84, 2015.

Yalcinkaya, Fatma et al., "Polyvinyl Butyral (PVB) Nanofiber/Nanoparticle-Covered Yarns for Antibacterial Textile Surfaces" International Journal of Molecular Sciences, 20, 4317, Sep. 3, 2019.

Parrott, Daniel et al, "Anti-Microbial Effects of Conductive Copper Nanoparticle Film" Journal of Pure and Applied Microbiology, vol. 11, pp. 661-668, Jun. 2017.

Extended European Search Report dated Sep. 4, 2024 for International Application No. EP 21 90 0177.3.

Sanisol C Product Information; Kao Corporation; Japanese Pharmacopoeia Benzalkonium Chloride Solution (for manufacturing only); p. 1—with English translation; Apr. 25, 2014, Retrieved from the Internet: <URL:https://chemical.kao.com/content/dam/sites/kao/chemical-kao-com/ja/products/catalog_jpja_B0002732.pdf>; cited in supplementary European search report for equivalent European patent application No. 21900177.3 filed herewith.

* cited by examiner

A

B

CLEAR COATING ANTIMICROBIAL COMPOSITIONS, METHODS OF PREPARATION, AND USES THEREOF FOR CONFERRING ANTIMICROBIAL ACTIVITY TO A SURFACE

CROSS REFERENCE TO RELATED APPLICATIONS

This is a national stage filing under Section 371 of International Application No. PCT/IB2021/061079, filed on Nov. 29, 2021, and which application claims priority to United States provisional patent application U.S. 63/119,855 filed on Dec. 1, 2020, entire disclosures of which applications are hereby incorporated herein by reference in their entirety.

FIELD OF THE INVENTION

The invention relates to the field of antimicrobial coatings, and more particularly to clear antimicrobial coatings.

BACKGROUND OF THE INVENTION

With the current COVID-19 pandemic, there has been a huge increase in the need for widespread, long-lasting antimicrobial products to be deployed in public settings. This is especially true in health care facilities, where proper cleaning and sanitation of instruments, surfaces, and other equipment are critical towards minimizing the transmission of infectious diseases such as COVID-19. Fomite transmission is considered to be a likely method of patient-to-patient viral spread, as numerous studies have detected viral RNA contaminated on surfaces in the environment of COVID patients. Furthermore, additional studies have detected viable SARS-CoV-2 viruses on numerous different surfaces, including up to 72 hours after exposure on plastic and stainless steel. Contaminated surfaces pose a major risk for transmission in a healthcare setting, both to patients and healthcare staff, indicating the need for continued antimicrobial protection in these settings.

Beyond the need for antimicrobial solutions to aid in the fight against the COVID-19 pandemic, hospitals and medical clinics are susceptible to other pathogens, including antimicrobial-resistant bacteria. Pathogens such as methicillin-resistant *Staphylococcus aureus* (MRSA), *Clostridium difficile*, vancomycin-resistant enterococci (VRE), and norovirus persist in hospital environments for days, further compounding the issue of sanitation in clinical settings.

Much work has been done in the fields of antimicrobial coatings in order to try and combat the above-mentioned challenges. Many commercially available products utilize metallic, active ingredients which are known to have antimicrobial properties (e.g., silver and/or copper). However, risks of antimicrobial resistance to metal-based active ingredients, as well as the possible impacts of heavy metals leaching into the environment has driven the need for alternative active ingredients in antimicrobial coatings. Some researchers and companies have developed alternate antimicrobial coatings technologies, such as ultraviolet light-activated active ingredients; however, these types of technologies are not currently widely available.

Quaternary ammonium compounds (QAC's) are widely known for their broad-spectrum antibacterial and antiviral properties. QAC's work by targeting the cytoplasmic membranes of pathogens, causing cytolytic leakage of intercellular materials, resulting in bacterial and/or viral death.

Numerous publications have documented the efficacy of QAC's against a wide swath of bacteria, including *Listeria monocytogenes* and *Escherichia coli*, *Staphylococcus*, and *Enterococcus* saccharolyticus. Likewise, QAC's efficacy against enveloped viruses has also been well documented in the literature, at least against rotavirus, and SARS-CoV. Due to their broad-spectrum effectiveness against several pathogens, as well as its relatively safe nature, QAC's such as benzalkonium chloride are often used in surface disinfectant products, including those of food contact surfaces.

Incorporation of antimicrobial compounds into long-lasting, film-forming products is highly desirable to provide continual sanitation of surfaces, especially those in high-traffic areas (e.g., doorknobs, washroom faucets, etc.), in high-risk locations (e.g., health care facilities), or to coat medical devices and implants to prevent infection.

Antimicrobial coatings containing QAC's are found in the literature, either as self-forming films or incorporated into polymeric films. For instance, Zanini et al. designed a QAC-modified polyurethane catheter in which an acrylic acid polymer layer was deposited on the surface of the catheter, and then silyl-modified QAC, 3-(methoxysilyl)-propyldimethyloctadecylammonium chloride, was added to the surface, resulting in a permanent bond between the QAC and acrylic acid polymer, and hence creating a thin QAC coating (Zanini, S. et. al. Development of Antibacterial Quaternary Ammonium Silane Coatings on Polyurethane Catheters. J. Colloid. Interf. Sci. 451. 78-84 (2015)). Reilman et al. designed a QAC/polymer coating for use as a long-lasting protective antimicrobial "glove". Copolymers of polyvinylpyrrolidone and a branched C20 derivatized maleate (M20) copolymer were synthesized with the QAC Benzalkonium chloride incorporated, resulting in prolonged antimicrobial coverage of the 'user's hands (Reilman, E. et al. Towards an Antimicrobial Microglove. Sci. Rep. 5. 16679 (2015)).

Antimicrobial coatings are also described in the following patent documents: US 2011/0014256, US 2020/0000693, US 2019/0133126, US 2012/0201902, US 2010/0233146, US 2008/01317795, US 2010/0136073, and CA 2,588,775.

Numerous film-forming agents are also known in the literature, mainly falling under the categories of synthetic polymers or resins. Such examples include methacrylates, acrylamides, or more targeted examples such as polyvinylpyrrolidone (PVP). One specific example includes polyvinyl butyral (PVB), which forms a clear, durable, and solvent-resistant film upon drying on a surface. Due to these properties, PVB is commonly utilized as a film-forming agent where long-lasting film coatings are desired. Yalcinkaya et al. utilized PVB with antimicrobial agents Copper oxide and Vanadium (V) oxide incorporation to produce antimicrobial yarns (Yalcinkaya, F. et al. Polyvinyl Butyral (PVB) Nanofiber/Nanoparticle-Covered Yarns for Antibacterial Textile Surfaces. Int. J. Mol. Sci. 20. 4317 (2019)). In another published study, Parrott et al. incorporated copper nanoparticles into films of polyvinyl butyral to study its antimicrobial effects (Parrott, D. et al. Anti-Microbial Effects of Conductive Copper Nanoparticle Film. J. Pure. Appl. Microbio. 11 (2). 03 (2017)).

The use of PVB as a possible film-forming agent is also documented in a number of patent documents such as: US 2018/0194128, U.S. Pat. Nos. 6,162,839, 5,795,696, 5,202, 205, CA 1,222,947, GB 1498730, CN 109177244, US 2018/0223011, US 2011/0014256, US 2020/0000693, US 2018/0311128, WO 2018/148612, US 2019/0133126, US 2012/0201902, AU 2011/296133, US 2008/0317795, US 2010/0136073, US 2009/0123507, and U.S. Pat. No. 7,037, 513.

Although all these efforts, these coatings have issues. For instance, many of these coatings have no slow-release mechanism that would provide a leaching of active ingredients into the surrounding media. There are also issues associated with the methods of preparation of these existing coatings, with the solubility of the ingredients and/or with the application of the coating on different surfaces.

Accordingly, there is still a need for enhanced antimicrobial coatings.

There is particularly a need for a clear antimicrobial coating in which antimicrobial(s) is (are) coupled with carrier molecule(s) to produce a controlled-release coating.

There is a also a need for a clear coating incorporating antimicrobial(s) s and forming a thin polymer film when applied on surfaces such that antimicrobials are slowly released from the thin polymer film, resulting in long-lasting antimicrobial activity and minimal environmental leeching.

The present invention addresses these needs and other needs as it will be apparent from the review of the disclosure and description of the features of the invention hereinafter.

BRIEF SUMMARY OF THE INVENTION

According to one aspect, the invention relates to a clear coating antimicrobial composition, comprising: at least one antimicrobial; a vinyl acetal derivative polymer binder; and a solvent for solubilizing said at least one antimicrobial and said vinyl acetal derivative polymer binder.

In one preferred embodiment, the vinyl acetal derivative polymer binder comprises polyvinyl butyral, and the solvent is an organic solvent. In embodiments the solvent comprises an at least one alcohol, for instance a mixture of ethanol: butanol and/or a mixture of isopropanol and butanol and/or a mixture of ethanol and diacetone alcohol and/or a mixture of isopropanol and diacetone alcohol.

According to another aspect, the invention relates to a method for preparing a clear coating antimicrobial composition, comprising mixing at least one antimicrobial and a vinyl acetal derivative polymer binder in a solvent to obtain a soluble clear coating composition.

According to another aspect, the invention relates to a clear coating antimicrobial composition, comprising: at least one antimicrobial; and a binder polymer/solvent selected from the group consisting of an acrylic acid polymer, a polyester-based polymer, and an epoxy-based polymer.

According to another aspect, the invention relates to a method for preparing a clear coating antimicrobial composition, comprising: mixing at least one antimicrobial and a binder polymer/solvent to obtain a soluble clear coating antimicrobial composition.

According to another aspect, the invention relates to the uses clear coating antimicrobial compositions as defined herein for conferring antimicrobial activity to an article of manufacture and/or for providing antimicrobial activity to a surface. Related aspects concerns methods for conferring antimicrobial activity to a surface, comprising contacting the surface with a clear coating antimicrobial composition as defined herein.

According to another aspect, the invention relates to an article of manufacture comprising a clear coating antimicrobial composition as defined herein.

Additional aspects, advantages and features of the present invention will become more apparent upon reading of the following non-restrictive description of preferred embodiments which are exemplary and should not be interpreted as limiting the scope of the invention.

BRIEF DESCRIPTION OF THE FIGURES

FIG. 3A: Percentage (%) of microbial kill of coated vs control surfaces. FIG. 3B: colony forming units (CFU) count of MRSA on control (uncoated surfaces) vs P1 coated surfaces.

Figure 1:
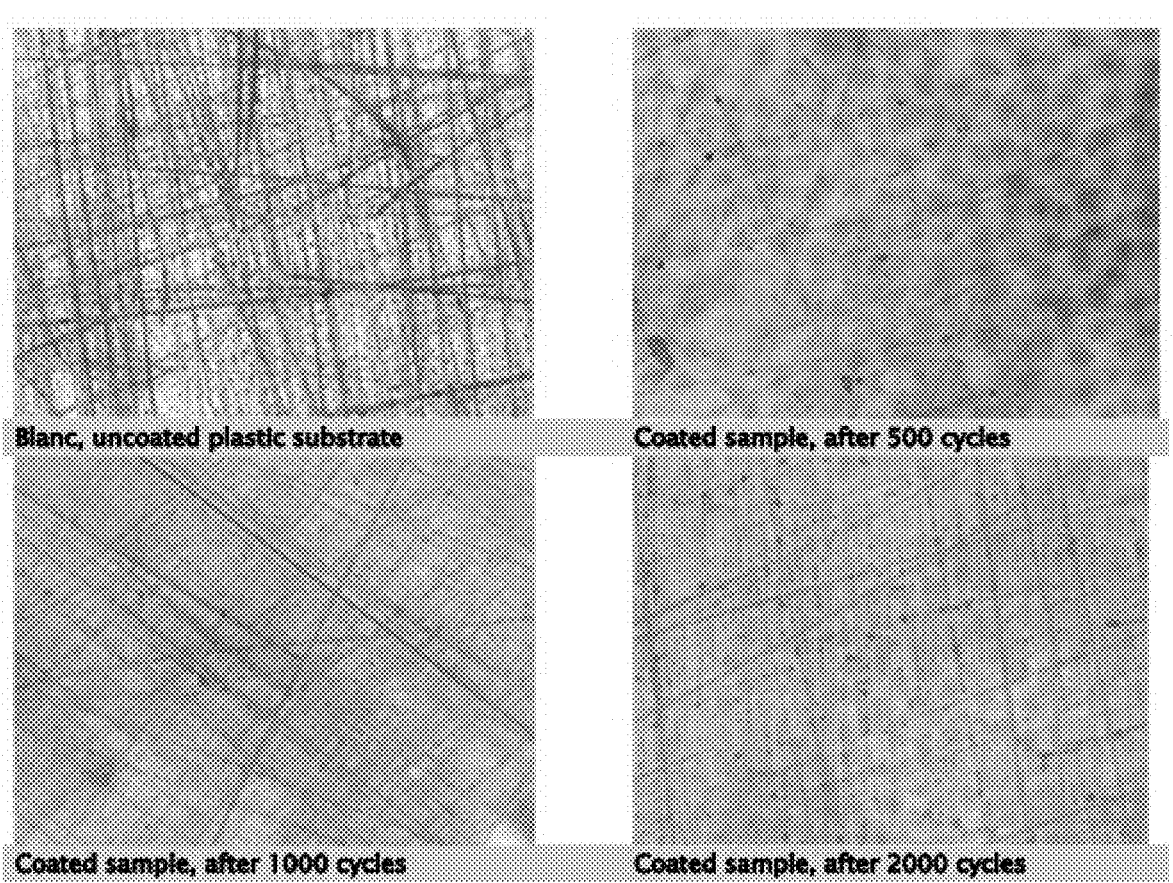
FIG. 1 is a panel showing confocal microscopy images of PMMA scrubbed surfaces, coated or not with a clear antimicrobial coating composition comprising PMMA, in accordance with Example 1.

Further details of the invention and its advantages will be apparent from the detailed description included below.

DETAILED DESCRIPTION OF EMBODIMENTS

In the following description of the embodiments, references to the accompanying figures are illustrations of an example by which the invention may be practiced. It will be understood that other embodiments may be made without departing from the scope of the invention disclosed. Unless defined otherwise, all technical and scientific terms used herein have the same meaning as commonly understood by one of ordinary skill in the art to which the invention belongs.

General Overview

As described herein, the present inventors have developed clear antimicrobial coating compositions that withstands at least 1000 wash cycles. A surface coated with a antimicrobial coating composition of the present invention maintains its efficacy against microbes (e.g. virus, bacteria, fungi, biofilms) despite repeated washings with soft scrub.

Clear Coating Antimicrobial Compositions

One aspect of the invention concerns a clear coating antimicrobial composition. According to one embodiment, the composition comprises at least one antimicrobial, a vinyl acetal polymer binder, and an organic solvent for solubilising the at least one antimicrobial and the vinyl acetate derivative polymer binder.

As used herein, the term "vinyl acetal derivative polymer binder" refers to an acetal formed by the reaction of an aldehyde and an alcohol. Suitable examples in accordance with the present invention includes, but are not limited to, those compounds derived from any aldehyde and polyvinyl alcohol such as poly(vinyl butyral) and poly(vinyl formal).

In embodiments, the vinyl acetal derivative polymer binder comprises polyvinyl butyral. In embodiments, the vinyl acetal derivative polymer binder consists of polyvinyl butyral. In embodiments, the polyvinyl butyral comprises a molecular weight ranging from about 40,000 Daltons to about 250,000 Daltons. In embodiments, the polyvinyl butyral comprises an Ostwald solution density of about 6 to about 260. In embodiments, the organic solvent is selected from polar protic solvents, dipolar aprotic solvents and mixtures thereof. Examples of polar protic solvents that may be used include, but are not limited to ethanol, n-butanol, methanol, propanol, isopropanol, diacetone alcohol, acetic acid and mixtures thereof. Examples of dipolar aprotic solvents that may be used include, but are not limited to, acetonitrile, dimethyl sulfoxides, hexamethylphosphoramide and mixtures thereof.

In embodiments, the organic solvent comprises at least one alcohol, e.g., or at least 1% w/w alcohol, or at least 5% w/w alcohol, or at least 10% w/w alcohol, or at least 25% w/w alcohol, or at least 50% w/w alcohol, or at least 60% w/w alcohol, or at least 70% w/w alcohol, or at least 75% w/w alcohol, or at least 80% w/w alcohol, or at least 85% w/w alcohol, or at least 90% w/w alcohol, or at least 95% w/w alcohol, or at least 98% w/w alcohol, or at least 99% w/w alcohol, or at least 99.9% w/w alcohol, based on the total weight of the composition. The at least one alcohol may be a single alcohol including, but not limited to monohydric alcohol such as methanol, ethanol, n-butanol, isobutanol, tert-butanol, isopropanol, n-propanol, pentanol, hexadecanol, diacetone alcohol, or polyhydric alcohols and mixtures of two or more alcohols.

In embodiments, the organic solvent comprises a mixture of ethanol and butanol, for instance about 70 w/w % to about 99.9 w/w % ethanol and about 30 to about 10 w/w % butanol, based on the total weight of the composition, e.g., about 79:15 w/w % ethanol: butanol, based on the total weight of the composition. In embodiments, the mixture comprises a ratio of about 84:16 w/w % ethanol: butanol or about 79:15 w/w %, based on the total weight of alcohol in the composition.

In embodiments, the organic solvent comprises a mixture of isopropanol and butanol, for instance about 70 w/w % to about 98 w/w % isopropanol and about 30 w/w % to about 10 w/w % butanol based on the total weight of the composition e.g., about 79:15 w/w % isopropanol: butanol based on the total weight of the composition. In embodiments, the mixture comprises a ratio of about 84:16 w/w % isopropanol: butanol based on the total weight of alcohol in the composition.

In preferred embodiments, the butanol used in accordance with the present invention is n-butanol.

In embodiments, the organic solvent comprises a mixture of ethanol:diacetone alcohol, for instance about 70 w/w % to about 98 w/w % ethanol and about 30 w/w % to about 10 w/w % diacetone alcohol, based on the total weight of the composition. In embodiments the mixture comprises a ratio of about 84:16 w/w % ethanol:diacetone alcohol based on the total weight of alcohol in the composition.

In embodiments, the organic solvent comprises a mixture of isopropanol:diacetone alcohol, for instance about 70 w/w % to about 98 w/w % isopropanol and about 30 w/w % to about 10 w/w % diacetone alcohol, based on the total weight of the composition. In embodiments the mixture comprises a ratio of about 84:16 w/w % isopropanol:diacetone alcohol based on the total weight of alcohol in the composition.

In accordance with another aspect, the invention relates to a clear coating antimicrobial composition wherein the solvent has been omitted. Instead, the composition comprises a compound which acts as both, a binder and a solvent, a compound referred herein as a "binder polymer/solvent".

Accordingly, in one another aspect, the invention concerns a clear coating antimicrobial composition comprising (i) at least one antimicrobial and (ii) a binder polymer/solvent. In particular embodiments, the binder polymer/solvent is selected from an acrylic acid polymer, a polyester-based polymer, an epoxy based polymer, and mixtures thereof.

Particular examples of an acrylic acid polymer include, but are not limited to, methyl methacrylate, Methacrylic Acid Methyl Ester, Methacrylic Methyl Ester, 2-(Methoxycarbonyl-propene, 2-Methyl-2-propenoic Acid Methyl Ester, Acryester M, Acryester MMA, Acryloid HT 100™, Light Ester M, MMA, Methyl 2-Methacrylate, Methyl 2-Methyl-2-propenoate, Methyl 2-Methylacrylate, Methyl Isobutanoate, Methyl Methacrylate, NSC 4769™, Paraloid HT 100™, Pegalan, TEB 3K™.

Particular examples of a polyester-based polymer include, but are not limited to, a polyester resin such as a liquid polyester resin supplied by Fibergall Supply Depot available on Amazon™.

Particular examples of an epoxy-based polymer include, but are not limited to, an epoxy resin such as D.E.R™ 732 liquid epoxy resin supplied by Palmerholland.

In embodiments, the clear coating antimicrobial composition is comprised of about 0.005% w/w to about 99.9% w/w of the binder polymer/solvent, or about 0.01% w/w to about 99% w/w, or about 0.1% w/w to about 20% w/w, or about 0.01% w/w to about 0.1% w/w of the binder polymer/solvent, or about 0.1% w/w to about 50% w/w of the polymer binder or about 0.05% w/w, based on the total weight of the composition.

In embodiments, the at least one antimicrobial is selected among quaternary ammonium compounds, metal ion-containing compounds, chelating agents, amino acid-based surfactants, antibiotics, compounds having a guanidine moiety, antifungal agents, antiviral agents and mixtures thereof. In embodiments, the antimicrobial is a cationic antimicrobial, e.g., quaternary ammonium compounds, metal ion-containing compounds, cationic chelating agents, cationic amino acid-based surfactants, cationic antibiotics, cationic compounds having a guanidine moiety, cationic antifungal agents, cationic antiviral agents and mixtures thereof. It is noted that antibiotics may be particularly useful for coating products and device having a medical use, especially for humans, for instance for coating medical devices. In embodiments, the medical device is coated with an antimicrobial suitable for medical uses in humans, including but not limited to antibiotics such as chlorhexidine or a combination of chlorhexidine and neomycin.

In embodiments, the metal ion-containing compound is a metal ion e.g., a metal ion including, but not limited to, silver (Ag), titanium (Ti), cobalt (Co), nickel (Ni), zinc (Zn), molybdenum (Mo), gallium (Ga), copper (Cu), zirconium (Zr), tin (Sn), lead (Pb), iron (Fe), and mixtures thereof.

In embodiments, the quaternary ammonium compound is selected from benzalkonium compounds having alkyl chains $C_8$ to $C_{18}$; quaternary ammonium compounds having an aromatic ring with hydrogen and chlorine, methyl and ethyl groups; quaternary ammonium compounds having a dialkylmethyl amino with twin chains; polymeric quaternary ammonium compounds and mixtures thereof.

Particular examples of quaternary ammonium compounds encompassed by the present invention include, but are not limited to, akyl dimethyl benzyl ammonium chloride (ADBAC), didecyl dimethyl ammonium chloride (DDAC), benzyldimethyl(2-dodecyloxyethyl)-ammonium chloride, benzyldimethyl(2-hydroxyethyl)ammonium chloride, benzyldimethyl (hexadecylcarbamoylmethyl)ammonium chloride, benzyldimethyl (tetradecylcarboamoylmethyl)ammonium chloride, benzyloxycarbonylmethyl-trimethylammonium chloride, bis-(2-hydroxyethyl)-ciannamyl(2-dodecyloxymethyl)ammonium chloride, benzyltriethylammonium chloride, tetramethylammonium chloride, tetramethylammonium iodide, tetraethylammonium hydroxide, tetramethylammonium hydroxide, benzyltrimethylammonium hydroxide, dimethyldioctadecylammonium chloride, dodecyltrimethylammonium choride, trimethylphenylammonium chloride, octadecyltrimethyl ammonium bromide, tetrabutyl ammonium bromide, tetramethylammonium nitrate, tetrabutylammonium hydroxide, didodecyldimethyl ammonium bromide, didodecyldimethylammonium chloride, dimethyldioctadecyl ammonium bromide, (2-(methacryloyloxy)ethyl)trimethylammonium chloride, dioctyl dimethyl ammonium chloride, tetrapropylammonium chloride, didecyldimethylammonium chloride, bezyldodecyldimethyl ammonium bromide, diallyl dimethyl ammonium chloride, benzalkonium bromide, ammonium bromide, benzyltributylammonium chloride, octyldecyl dimethyl ammonium chloride, tetrabutylammonium hydrogen sulfate, tetrabutylammonium tribromide, methyltributylammonium chloride, bis(hydrogenated tallow)dimethylammonium chloride, N-alkyldimethyl benzyl ammonium chloride, and tetrabutylammonium fluoride trihydrate.

In embodiments, the chelating agent is a cationic chelating agent and it is selected from ethyleneglycoltetraacetate (EGTA), ethylenediaminetetraacetate (EDTA), deferrioxamine B (DFO, desferal), D-penicillamine (DPA), 1,10-phenanthroline (phen), zinc pyrithione, and mixtures thereof.

In embodiments, the least one antimicrobial comprises at least one antiviral compound. As used herein, the term "antiviral" refers to any compound having the ability or potential of preventing viral infection of a host cell, and/or having the ability or potential reducing viral load of a host. The antiviral may act by destroying the virus, by inhibiting penetration of the virus into a host cell, by inhibiting viral replication, etc. Examples of antivirals include, but are not limited to, ritonavir, ribavirin, nelfinavir, acyclovir, penciclovir, cidofovir, adenine arabinoside, methisazone, idoxuridine, niclosamide, sofosbuvir, emricasan, mefloquine, palonosetron, inosine, lamivudine, stavudine, zidovudine, abacavir, didanosine, tenofovir, emtricitabine, efavirenz, nevirapine, indinavir, saquinavir amantadine, hydroxychloroquine, ribavirin, lopinavir, ritonavir, remdesivir, favipiravir, colchicine and ivermectine, and combinations thereof.

In embodiments, the antibiotic is selected among the following classes: aminoglycosides, ansamycins, carbacephems, carbapenems, cephalosporins, glycopeptides, lincosamides, lipopeptides, macrolides, monobactams, nitrofurans, oxazolidinones, penicillins, polypeptides, quinolines, fluoroquinolines, sulfonamides, tetracyclines, and mixtures thereof.

In more particular embodiments, the antibiotic is selected from the group consisting of clofazimine, dapsone, capreomycin, cycloserine, ethambutol, ethionamide, isoniazid, pyrazinamide, rifampicin (rifampin), rifabutin, rifapentine, streptomycin, arsphenamine, chloramphenicol, Fosfomycin, fusidic acid, niclosamide, metronidazole, mupirocin, platensimycin, quinupristin, dalfopristin, thiamphenicol, tigecycline, tinidazole, and trimethoprim, and mixtures thereof.

In embodiments, the guanidine moiety is selected from chlorhexidine gluconate (CHG), polyhexamethylene guanidine hydrochloride, guanidine hydrochloride, proguanil, cycloguanil, chlorproguanil, metformin, famotidine, nemaucing, rhodostreptomycin Å, rhodostreptomycin B, synoxaazolidinone A, synoxaazolidinone B, chemical derivatives thereof and mixtures thereof.

In embodiments, the at least one antimicrobial comprises an antifungal agent. As used herein, the term "antifungal agent" refers to any compound having antifungal activity including, but not limited to polyene (natamycin, rimocidin, candicin, etc.), imidazole, triazole, thiazole (miconazole, fluconazole, abafungin, etc.), allylamines (terbinafine, naftifine, etc.), echinocandin (caspofungin, micafungin, etc.), and other antifungals such as clotrimazole, fluconazole, ravuconazole, voriconazole, itraconazole, posaconazole, 5-flucytosine, ciclopirox, griseofulvin, etc.

In embodiments, the least one antimicrobial comprises at least one antimicrobial of plant origin. Examples of plant-derived antimicrobial compounds include, but are not limited to, alkaloid class of compounds (such as reserpine, piperine, conessine, berberine, tomatidine), phenolic/polyphenols (such as rhamentin, epigallocatechin gallate, chebulinic acid, 3-p-Trans-coumaroyl-2-hydroxyquinic acid, apigenin), sulfur-containing compounds (such as allicin, ajoene, sulforaphane, alyssin, allyl isothiocyanate, benzyl isothiocyanate, phenethyl, isothiocyanate), coumarins (such as aegelinol, agasyllin, 4'-senecioiloxyosthol, osthole, bergamottin epoxide), terpenes (such as furnesol, thymol, carvacrol, (4R)-carbone, cinnamaldehyde), and few other plant derived antimicrobial compounds such as limonen, p-cymene, terpinen-4-ol, caffeic acid, geranyl acetate, geranyl acetate, geraniol, p-coumaric acid, eugenol, isoeugenol, etc.

In embodiments, the least one antimicrobial comprises at least one antimicrobial of animal origin. Examples of animal-derived antimicrobial compounds include, but are not limited to, lactoferrin, chitosan, lipids, defensins, lactoperoxidase, ovotransferrin, lysozyme, pleurocidin, protamine, casein, whey, etc.

In embodiments, the least one antimicrobial comprises at least one antimicrobial of bacterial origin. Examples of bacterial-derived antimicrobial compounds include, but are not limited to, nisin, pediocin, natamycin, lactocin, acidophilin, bulgaricin, helveticin, plantaricin, reuterin, etc.

In embodiments, the antimicrobial peptides is selected among the antibacterial peptides, antifungal peptides (AFPs), antiviral peptides (AVPs), antiparasitic peptides, anticancer peptides, etc.

The amount or concentration of antimicrobial(s) in the composition may vary according to different factors, including the type of antimicrobial(s) being utilized. In embodiments, the composition is comprised of about 0.004% w/w to about 5% w/w of the antimicrobial(s), or about 0.04% w/w to about 5% w/w, or about 0.1% w/w to about 0.5% w/w, of about 0.1% w/w to about 3% w/w, of 0.5% w/w to about 2% w/w of the antimicrobial(s), based on the total weight of the composition.

In preferred embodiments, the clear coating antimicrobial composition of the invention further comprises a carrier. Addition of carrier may be preferable to assist in holding the antimicrobial(s) in the clear coating formulation and/or assist in providing a desired antimicrobial efficacy and durability.

In particular embodiments, the carrier is selected among cellulose polymers, acrylic polymers, glycol polymers, polyvinyl alcohols, pyrrolidones and mixtures thereof.

In embodiments, the cellulose polymer is selected among hydroxypropyl methylcellulose (HPMC), hydroxypropyl cellulose (HPC), hydroxyethylcellulose (HEC), hydroxyethyl methyl cellulose (HEMC), methylcellulose (MC), sodium carboxymethyl cellulose (NaCMC), ethylcellulose (EC), and mixtures thereof.

In embodiments, the glycol polymer is selected among polyethylene glycol (PEG), polypropylene glycol (PPG), poly tetrahydrofuran (PTF), and mixtures thereof.

In embodiments, the acrylic polymer is selected among poly(methacrylate) [PMA], poly(methyl methacrylate) [PMMA], poly(ethyl methacrylate) [PEMA], poly(2-hydroxyethyl methacrylate) [poly-HEMA], and mixtures thereof.

In embodiments, the polyvinyl alcohol is polyvinyl alcohol-polyethylene.

In embodiments, the pyrrolidone is selected among polyvinylpyrrolidone (PVP), polyvinyl pyrrolidone-polyvinyl acetate, and mixtures thereof.

In embodiments, the composition is comprised of about 0.005% w/w to about 20% w/w of the polymer binder, or about 0.01% w/w to about 10% w/w, or about 0.01% w/w to about 5% w/w, or about 0.1% w/w to about 1% w/w, or about 0.01% w/w to about 0.1% w/w of the polymer binder, or about 0.05% w/w, based on the total weight of the composition.

The clear coating antimicrobial composition of the invention may also comprise additive(s). Additives may be helpful to enhance various properties of the composition or final coating. For instance, additives could be used to improve the preservation properties (e.g., glutaraldehyde, bronopol, methylisothiazolinone), mechanical properties (e.g., zinc stearate), thermal properties, electrical properties, barrier properties, rheology properties (e.g., hydrophobically modified alkali-swellable emulsions, hydrophobically modified ethoxylate urethanes, cellulosics, fumed silicas, organo clays, etc.), scavenging properties (e.g., oleic acid), exfoliation properties (e.g., phosphonium, tributyl tetragecyl compounds), fire-retardant properties, permeability properties, surfactant properties (e.g., sodium dodecyl sulfate, amine oxides, octyl phenol ethoxylate, octylphenoxypolyethoxyethanol, polyoxyethylene (20) sorbitan monolaurate, taurocholic acid, sodium cholate sarcosine, cetylpyridinium chloride, cetrimonium bromide, benzethonium chloride and mixtures thereof), rust-proofing properties (e.g., sodium benzoate, triethanolamine, sodium nitrite), olfactive properties (e.g., perfume), wetting properties (e.g., aromatic ethoxylates, polyamids, polyether amines, silicone based agents, carboxylated fatty acids, soya lecithin and derivatives, sulfonates, sulfates, etc.), drying properties (e.g., linseed oil, tung oil, metal carboxylates such as naphthenates, neodeconoates, octoates, etc.), adhesion properies (e.g. organo functional silanes, organo metallic salts, esters, titanates, zirconates, functional copolymers), flow and levelling properties (e.g., cellulose acetate butyrates, benzoin, polysiloxines (silicones), mineral oils, mineraspirits), scratch & mar resistance properties (eg. Waxes including natural waxes, synthetic waxes, mineral hydro carbon waxes, petroleum waxes, silicone based agents such as modified polydimethylsiloxane, fluoro & PTFE based agents, silica & colloidal silica, metal oxides & nanoparticles, etc.).

In one particular embodiments, the clear coating antimicrobial composition, comprises: (i) N-alkyl dimethyl benzyl ammonium chloride (ADBAC); (ii) polyvinylbutyral (PVB); and a solvent for solubilizing (i) and (ii), the solvent comprising a mixture of ethanol and butanol. In one particular embodiment, the composition further comprises ethylcellulose. In one particular embodiment, the ADBAC consists of N-alkyl (40% $C_{12}$, 50% $C_{14}$, 10% $C_{16}$) dimethylbenzylammonium chloride.

In particular embodiments, the antimicrobial clear coating composition is anyone from coating formulation numbers 1 to 158 listed Table 1A below. In this Table, R represents the vinyl acetal derivative polymer binder; $R_1$ represents the optional (preferred) carrier; $R_2$ represents antimicrobial(s) and $R_3$ represent the solvent(s).

TABLE 1A

| Formulation Number | R* | $R_1$** | $R_2$*** | $R_3$ |
|---|---|---|---|---|
| | Particular examples of clear coating antimicrobial compositions comprising a vinyl acetal derivative polymer binder |
| 1 | PVB | EC | ADBAC | Ethanol:n-Butanol |
| 2 | PVB | EC | ADEBAC | Ethanol:n-Butanol |
| 3 | PVB | EC | ADBAC:ADEBAC | Ethanol:n-Butanol |
| 4 | PVB | EC | DDAC | Ethanol:n-Butanol |
| 5 | PVB | EC | DDAC:ADBAC | Ethanol:n-Butanol |
| 6 | PVB | EC | ADBAS | Ethanol:n-Butanol |
| 7 | PVB | EC | ADBAC:DDAC | Ethanol:n-Butanol |
| 8 | PVB | EC | ADBAC:ADBAS | Ethanol:n-Butanol |
| 9 | PVB | EC | ADEBAC:DDAC | Ethanol:n-Butanol |
| 10 | PVB | EC | ADEBAC:ADBAS | Ethanol:n-Butanol |
| 11 | PVB | EC | ADBAC:ADEBAC:DDAC | Ethanol:n-Butanol |
| 12 | PVB | EC | ADBAC:ADEBAC:DDAC:ADBAS | Ethanol:n-Butanol |
| 13 | PVB | EC | ADBAC:ODDAC:DODAC:DDDAC | Ethanol:n-Butanol |
| 14 | PVB | EC | BC | Ethanol:n-Butanol |
| 15 | PVB | EC | HTAC | Ethanol:n-Butanol |
| 16 | PVB | EC | DTAB | Ethanol:n-Butanol |
| 17 | PVB | EC | TTAB | Ethanol:n-Butanol |
| 18 | PVB | EC | Chlorhexidine | Ethanol:n-Butanol |
| 19 | PVB | EC | Chlorhexidine:Neomycin | Ethanol:n-Butanol |
| 20 | PVB | EC | Antibiotic | Ethanol:n-Butanol |
| 21 | PVB | EC | ADBAC | 2-propanol:n-Butanol |
| 22 | PVB | EC | ADEBAC | 2-propanol:n-Butanol |
| 23 | PVB | EC | ADBAC:ADEBAC | 2-propanol:n-Butanol |
| 24 | PVB | EC | DDAC | 2-propanol:n-Butanol |
| 25 | PVB | EC | DDAC:ADBAC | 2-propanol:n-Butanol |
| 26 | PVB | EC | ADBAS | 2-propanol:n-Butanol |
| 26 | PVB | EC | ADBAC:DDAC | 2-propanol:n-Butanol |
| 27 | PVB | EC | ADBAC:ADBAS | 2-propanol:n-Butanol |
| 28 | PVB | EC | ADEBAC:DDAC | 2-propanol:n-Butanol |
| 29 | PVB | EC | ADEBAC:ADBAS | 2-propanol:n-Butanol |
| 30 | PVB | EC | ADBAC:ADEBAC:DDAC | 2-propanol:n-Butanol |
| 31 | PVB | EC | ADBAC:ADEBAC:DDAC:ADBAS | 2-propanol:n-Butanol |

TABLE 1A-continued

Particular examples of clear coating antimicrobial compositions
comprising a vinyl acetal derivative polymer binder

| Formulation Number | R* | R$_1$** | R$_2$*** | R$_3$ |
|---|---|---|---|---|
| 32 | PVB | EC | ADBAC:ODDAC:DODAC:DDDAC | 2-propanol:n-Butanol |
| 33 | PVB | EC | BC | 2-propanol:n-Butanol |
| 34 | PVB | EC | HTAC | 2-propanol:n-Butanol |
| 35 | PVB | EC | DTAB | 2-propanol:n-Butanol |
| 36 | PVB | EC | TTAB | 2-propanol:n-Butanol |
| 37 | PVB | EC | ChlorhexidineA | 2-propanol:n-Butanol |
| 38 | PVB | EC | Chlorhexidine:Neomycin | 2-propanol:n-Butanol |
| 39 | PVB | EC | Antibiotic | 2-propanol:n-Butanol |
| 40 | PVB | EC | ADBAC | Ethanol:Diacetone alcohol |
| 41 | PVB | EC | ADEBAC | Ethanol:Diacetone alcohol |
| 42 | PVB | EC | ADBAC:ADEBAC | Ethanol:Diacetone alcohol |
| 43 | PVB | EC | DDAC | Ethanol:Diacetone alcohol |
| 44 | PVB | EC | DDAC:ADBAC | Ethanol:Diacetone alcohol |
| 45 | PVB | EC | ADBAS | Ethanol:Diacetone alcohol |
| 46 | PVB | EC | ADBAC:DDAC | Ethanol:Diacetone alcohol |
| 47 | PVB | EC | ADBAC:ADBAS | Ethanol:Diacetone alcohol |
| 48 | PVB | EC | ADEBAC:DDAC | Ethanol:Diacetone alcohol |
| 49 | PVB | EC | ADEBAC:ADBAS | Ethanol:Diacetone alcohol |
| 50 | PVB | EC | ADBAC:ADEBAC:DDAC | Ethanol:Diacetone alcohol |
| 51 | PVB | EC | ADBAC:ADEBAC:DDAC:ADBAS | Ethanol:Diacetone alcohol |
| 52 | PVB | EC | ADBAC:ODDAC:DODAC:DDDAC | Ethanol:Diacetone alcohol |
| 53 | PVB | EC | BC | Ethanol:Diacetone alcohol |
| 54 | PVB | EC | HTAC | Ethanol:Diacetone alcohol |
| 55 | PVB | EC | DTAB | Ethanol:Diacetone alcohol |
| 56 | PVB | EC | TTAB | Ethanol:Diacetone alcohol |
| 57 | PVB | EC | Chlorhexidine | Ethanol:Diacetone alcohol |
| 58 | PVB | EC | Chlorhexidine:Neomycin | Ethanol:Diacetone alcohol |
| 59 | PVB | EC | Antibiotic | Ethanol:Diacetone alcohol |
| 60 | PVB | EC | ADBAC | 2-propanol:Diacetone alcohol |
| 61 | PVB | EC | ADEBAC | 2-propanol:Diacetone alcohol |
| 62 | PVB | EC | ADBAC:ADEBAC | 2-propanol:Diacetone alcohol |
| 63 | PVB | EC | DDAC | 2-propanol:Diacetone alcohol |
| 64 | PVB | EC | DDAC:ADBAC | 2-propanol:Diacetone alcohol |
| 65 | PVB | EC | ADBAS | 2-propanol:Diacetone alcohol |
| 66 | PVB | EC | ADBAC:DDAC | 2-propanol:Diacetone alcohol |
| 67 | PVB | EC | ADBAC:ADBAS | 2-propanol:Diacetone alcohol |
| 68 | PVB | EC | ADEBAC:DDAC | 2-propanol:Diacetone alcohol |
| 69 | PVB | EC | ADEBAC:ADBAS | 2-propanol:Diacetone alcohol |
| 70 | PVB | EC | ADBAC:ADEBAC:DDAC | 2-propanol:Diacetone alcohol |
| 71 | PVB | EC | ADBAC:ADEBAC:DDAC:ADBAS | 2-propanol:Diacetone alcohol |
| 72 | PVB | EC | ADBAC:ODDAC:DODAC:DDDAC | 2-propanol:Diacetone alcohol |

TABLE 1A-continued

Particular examples of clear coating antimicrobial compositions
comprising a vinyl acetal derivative polymer binder

| Formulation Number | R* | $R_1$** | $R_2$*** | $R_3$ |
|---|---|---|---|---|
| 73 | PVB | EC | BC | 2-propanol:Diacetone alcohol |
| 74 | PVB | EC | HTAC | 2-propanol:Diacetone alcohol |
| 75 | PVB | EC | DTAB | 2-propanol:Diacetone alcohol |
| 76 | PVB | EC | TTAB | 2-propanol:Diacetone alcohol |
| 77 | PVB | EC | Chlorhexidine | 2-propanol:Diacetone alcohol |
| 78 | PVB | EC | Chlorhexidine:Neomycin | 2-propanol:Diacetone alcohol |
| 79 | PVB | EC | Antibiotic | 2-propanol:Diacetone alcohol |
| 80 | PVB | EC | ADBAC | Ethanol |
| 81 | PVB | EC | ADEBAC | Ethanol |
| 82 | PVB | EC | ADBAC:ADEBAC | Ethanol |
| 83 | PVB | EC | DDAC | Ethanol |
| 84 | PVB | EC | DDAC:ADBAC | Ethanol |
| 85 | PVB | EC | ADBAS | Ethanol |
| 86 | PVB | EC | ADBAC:DDAC | Ethanol |
| 87 | PVB | EC | ADBAC:ADBAS | Ethanol |
| 88 | PVB | EC | ADEBAC:DDAC | Ethanol |
| 89 | PVB | EC | ADEBAC:ADBAS | Ethanol |
| 90 | PVB | EC | ADBAC:ADEBAC:DDAC | Ethanol |
| 91 | PVB | EC | ADBAC:ADEBAC:DDAC:ADBAS | Ethanol |
| 92 | PVB | EC | ADBAC:ODDAC:DODAC:DDDAC | Ethanol |
| 93 | PVB | EC | BC | Ethanol |
| 94 | PVB | EC | HTAC | Ethanol |
| 95 | PVB | EC | DTAB | Ethanol |
| 96 | PVB | EC | TTAB | Ethanol |
| 97 | PVB | EC | Chlorhexidine | Ethanol |
| 98 | PVB | EC | Chlorhexidine:Neomycin | Ethanol |
| 99 | PVB | EC | Antibiotic | Ethanol |
| 100 | PVB | EC | ADBAC | 2-propanol |
| 101 | PVB | EC | ADEBAC | 2-propanol |
| 102 | PVB | EC | ADBAC:ADEBAC | 2-propanol |
| 103 | PVB | EC | DDAC | 2-propanol |
| 104 | PVB | EC | DDAC:ADBAC | 2-propanol |
| 105 | PVB | EC | ADBAS | 2-propanol |
| 106 | PVB | EC | ADBAC:DDAC | 2-propanol |
| 107 | PVB | EC | ADBAC:ADBAS | 2-propanol |
| 108 | PVB | EC | ADEBAC:DDAC | 2-propanol |
| 109 | PVB | EC | ADEBAC:ADBAS | 2-propanol |
| 110 | PVB | EC | ADBAC:ADEBAC:DDAC | 2-propanol |
| 111 | PVB | EC | ADBAC:ADEBAC:DDAC:ADBAS | 2-propanol |
| 112 | PVB | EC | ADBAC:ODDAC:DODAC:DDDAC | 2-propanol |
| 113 | PVB | EC | BC | 2-propanol |
| 114 | PVB | EC | HTAC | 2-propanol |
| 115 | PVB | EC | DTAB | 2-propanol |
| 116 | PVB | EC | TTAB | 2-propanol |
| 117 | PVB | EC | Chlorhexidine | 2-propanol |
| 118 | PVB | EC | Chlorhexidine:Neomycin | 2-propanol |
| 119 | PVB | EC | Antibiotic | 2-propanol |
| 120 | PVB | EC | ADBAC | n-Butanol |
| 121 | PVB | EC | ADEBAC | n-Butanol |
| 122 | PVB | EC | ADBAC:ADEBAC | n-Butanol |
| 123 | PVB | EC | DDAC | n-Butanol |
| 124 | PVB | EC | DDAC:ADBAC | n-Butanol |
| 125 | PVB | EC | ADBAS | n-Butanol |
| 126 | PVB | EC | ADBAC:DDAC | n-Butanol |
| 127 | PVB | EC | ADBAC:ADBAS | n-Butanol |
| 128 | PVB | EC | ADEBAC:DDAC | n-Butanol |
| 129 | PVB | EC | ADEBAC:ADBAS | n-Butanol |
| 130 | PVB | EC | ADBAC:ADEBAC:DDAC | n-Butanol |
| 131 | PVB | EC | ADBAC:ADEBAC:DDAC:ADBAS | n-Butanol |
| 132 | PVB | EC | ADBAC:ODDAC:DODAC:DDDAC | n-Butanol |
| 133 | PVB | EC | BC | n-Butanol |
| 134 | PVB | EC | HTAC | n-Butanol |
| 135 | PVB | EC | DTAB | n-Butanol |
| 136 | PVB | EC | TTAB | n-Butanol |
| 137 | PVB | EC | Chlorhexidine | n-Butanol |
| 138 | PVB | EC | Chlorhexidine:Neomycin | n-Butanol |
| 139 | PVB | EC | Antibiotic | n-Butanol |

TABLE 1A-continued

Particular examples of clear coating antimicrobial compositions
comprising a vinyl acetal derivative polymer binder

| Formulation Number | R* | R₁** | R₂*** | R₃ |
|---|---|---|---|---|
| 140 | PVB | EC | ADBAC | Diacetone alcohol |
| 141 | PVB | EC | ADEBAC | Diacetone alcohol |
| 142 | PVB | EC | ADBAC:ADEBAC | Diacetone alcohol |
| 143 | PVB | EC | DDAC | Diacetone alcohol |
| 144 | PVB | EC | DDAC:ADBAC | Diacetone alcohol |
| 145 | PVB | EC | ADBAS | Diacetone alcohol |
| 146 | PVB | EC | ADBAC:DDAC | Diacetone alcohol |
| 147 | PVB | EC | ADBAC:ADBAS | Diacetone alcohol |
| 147 | PVB | EC | ADEBAC:DDAC | Diacetone alcohol |
| 148 | PVB | EC | ADEBAC:ADBAS | Diacetone alcohol |
| 149 | PVB | EC | ADBAC:ADEBAC:DDAC | Diacetone alcohol |
| 150 | PVB | EC | ADBAC:ADEBAC:DDAC:ADBAS | Diacetone alcohol |
| 151 | PVB | EC | ADBAC:ODDAC:DODAC:DDDAC | Diacetone alcohol |
| 152 | PVB | EC | BC | Diacetone alcohol |
| 153 | PVB | EC | HTAC | Diacetone alcohol |
| 154 | PVB | EC | DTAB | Diacetone alcohol |
| 155 | PVB | EC | TTAB | Diacetone alcohol |
| 156 | PVB | EC | Chlorhexidine | Diacetone alcohol |
| 157 | PVB | EC | Chlorhexidine:Neomycin | Diacetone alcohol |
| 158 | PVB | EC | Antibiotic | Diacetone alcohol |

*PVB = Polyvinylbutyral;
**EC = Ethyl cellulose;
***ADBAC = N-alkyl dimethyl benzyl ammonium chloride; ADEBAC = N-alkyl dimethyl ethylbenzyl ammonium chloride; DDAC = Didecyl dimethyl ammonium chloride; ADBAS = N-alkyl dimethyl benzyl ammonium saccharinate; ODDAC = Octyl decyl dimethyl ammonium chloride; DODAC = Dooctyl dimethyl ammonium chloride; DDDAC = Didecyl dimethyl ammonium chloride; BC = Benzethonium chloride; HTAC = Hexadecyl trimethyl ammonium chloride; DTAB = Decyl trimethyl ammonium bromide; TTAB = Tetra trimethyl ammonium bromide In accordance with the present invention, combination of an appropriate vinyl acetal derivative polymer binder, plus or minus a carrier, with that of antimicrobial(s) in an appropriate solvent system will result in a transparent coating formulation that possess long-lasting antimicrobial activity, and that can be applied on a diversified hard surface.

For instance, as demonstrated in the Exemplification section, a combination of appropriate acetal derivative polymer binder, carrier and antimicrobial result in a coating material with superior durability and antimicrobial efficacy against a range of multidrug-resistant pathogens. Similarly, combinations of quaternary ammonium compounds with an appropriate polymer binder, and appropriate carrier also provided nanocomposites with significant antimicrobial activities with significant durability against scrub resistance challenges.

In particular embodiments, the antimicrobial clear coating composition is anyone from coating formulation numbers 159 to 218 listed Table 1B below. In this Table, R represents the binder polymer/solvent, R₁ represents an optional (preferred) carrier and R₂ represents antimicrobial(s).

TABLE 1B

Particular examples of clear coating antimicrobial
compositions comprising a binder polymer/solvent

| Formulation Number | R* | R₁** | R₂*** |
|---|---|---|---|
| 159 | MMA | EC | ADBAC |
| 160 | MMA | EC | ADEBAC |
| 161 | MMA | EC | ADBAC:ADEBAC |
| 162 | MMA | EC | DDAC |
| 163 | MMA | EC | DDAC:ADBAC |
| 164 | MMA | EC | ADBAS |
| 165 | MMA | EC | ADBAC:DDAC |
| 166 | MMA | EC | ADBAC:ADBAS |

TABLE 1B-continued

Particular examples of clear coating antimicrobial
compositions comprising a binder polymer/solvent

| Formulation Number | R* | R₁** | R₂*** |
|---|---|---|---|
| 167 | MMA | EC | ADEBAC:DDAC |
| 168 | MMA | EC | ADEBAC:ADBAS |
| 169 | MMA | EC | ADBAC:ADEBAC:DDAC |
| 170 | MMA | EC | ADBAC:ADEBAC:DDAC:ADBAS |
| 171 | MMA | EC | ADBAC:ODDAC:DODAC:DDDAC |
| 172 | MMA | EC | BC |
| 173 | MMA | EC | HTAC |
| 174 | MMA | EC | DTAB |
| 175 | MMA | EC | TTAB |
| 176 | MMA | EC | Chlorhexidine |
| 177 | MMA | EC | Chlorhexidine:Neomycin |
| 178 | MMA | EC | Antibiotic |
| 179 | Polyester | EC | ADBAC |
| 180 | Polyester | EC | ADEBAC |
| 181 | Polyester | EC | ADBAC:ADEBAC |
| 182 | Polyester | EC | DDAC |
| 183 | Polyester | EC | DDAC:ADBAC |
| 184 | Polyester | EC | ADBAS |
| 185 | Polyester | EC | ADBAC:DDAC |
| 186 | Polyester | EC | ADBAC:ADBAS |
| 187 | Polyester | EC | ADEBAC:DDAC |
| 188 | Polyester | EC | ADEBAC:ADBAS |
| 189 | Polyester | EC | ADBAC:ADEBAC:DDAC |
| 190 | Polyester | EC | ADBAC:ADEBAC:DDAC:ADBAS |
| 191 | Polyester | EC | ADBAC:ODDAC:DODAC:DDDAC |
| 192 | Polyester | EC | BC |
| 193 | Polyester | EC | HTAC |
| 194 | Polyester | EC | DTAB |
| 195 | Polyester | EC | TTAB |
| 196 | Polyester | EC | Chlorhexidine |
| 197 | Polyester | EC | Chlorhexidine:Neomycin |
| 198 | Polyester | EC | Antibiotic |
| 199 | Epoxy resin | EC | ADBAC |
| 200 | Epoxy resin | EC | ADEBAC |
| 201 | Epoxy resin | EC | ADBAC:ADEBAC |

TABLE 1B-continued

Particular examples of clear coating antimicrobial
compositions comprising a binder polymer/solvent

| Formu-lation Number | R* | R₁** | R₂*** |
|---|---|---|---|
| 202 | Epoxy resin | EC | DDAC |
| 203 | Epoxy resin | EC | DDAC:ADBAC |
| 204 | Epoxy resin | EC | ADBAS |
| 205 | Epoxy resin | EC | ADBAC:DDAC |
| 206 | Epoxy resin | EC | ADBAC:ADBAS |
| 207 | Epoxy resin | EC | ADEBAC:DDAC |
| 208 | Epoxy resin | EC | ADEBAC:ADBAS |
| 209 | Epoxy resin | EC | ADBAC:ADEBAC:DDAC |
| 210 | Epoxy reisn | EC | ADBAC:ADEBAC:DDAC:ADBAS |
| 211 | Epoxy resin | EC | ADBAC:ODDAC:DODAC:DDDAC |
| 212 | Epoxy resin | EC | BC |
| 213 | Epoxy resin | EC | HTAC |
| 214 | Epoxy resin | EC | DTAB |
| 215 | Epoxy resin | EC | TTAB |
| 216 | Epoxy resin | EC | Chlorhexidine |
| 217 | Epoxy resin | EC | Chlorhexidine:Neomycin |
| 218 | Epoxy resin | EC | Antibiotic |

*MMA = Methyl Methacrylate
**EC = Ethyl cellulose;
***ADBAC = N-alkyl dimethyl benzyl ammonium chloride; ADEBAC = N-alkyl dimethyl ethylbenzyl ammonium chloride; DDAC = Didecyl dimethyl ammonium chloride; ADBAS = N-alkyl dimethyl benzyl ammonium saccharinate; ODDAC = Octyl decyl dimethyl ammonium chloride; DODAC = Dooctyl dimethyl ammonium chloride; DDDAC = Didecyl dimethyl ammonium chloride; BC = Benzethonium chloride; HTAC = Hexadecyl trimethyl ammonium chloride; DTAB = Decyl trimethyl ammonium bromide; TTAB = Tetra trimethyl ammonium bromide In accordance with the present invention, combination of antimicrobial(s) in an appropriate binder polymer/solvent will result in a transparent coating formulation that possess long-lasting antimicrobial activity, and that can be applied on a diversified hard surface.

For instance, as demonstrated in the Exemplification section, a combination of appropriate binder polymer/solvent and antimicrobial results in a coating material with superior durability (e.g. significant durability against scrub resistance challenges) and antimicrobial efficacy against a range of multidrug-resistant pathogens.

Methods of Preparation i) Compositions Comprising a Vinyl Acetal Derivative Polymer Binder Another aspect of the invention concerns methods for preparing a clear coating antimicrobial composition as defined hereinbefore.

In accordance with one embodiment, the method comprises mixing at least one antimicrobial and a vinyl acetal derivative polymer binder in an organic solvent to obtain a soluble clear coating antimicrobial composition.

In accordance with another embodiment, the method comprises the steps of:

mixing the least one antimicrobial in the organic solvent to obtain a soluble antimicrobial mixture;

mixing the vinyl acetal derivative polymer binder into the soluble antimicrobial mixture to obtain said soluble antimicrobial clear coating composition.

In accordance with another embodiment, the at least one antimicrobial and the vinyl acetal derivative polymer binder are mixed simultaneously into the organic solvent to obtain the clear coating antimicrobial composition.

In accordance with another embodiment, the methods above further comprises mixing to solubilization a carrier. In one particular embodiment, the carrier is mixed in the organic solvent with the antimicrobial(s) and prior to mixing the vinyl acetal derivative polymer binder with the antimicrobial(s). In another particular embodiment, the carrier is mixed in the organic solvent with the antimicrobial(s) and after mixing of the vinyl acetal derivative polymer binder with the antimicrobial(s). In one particular embodiment, the carrier is mixed in the organic solvent concomitantly with the vinyl acetal derivative polymer binder (e.g., simultaneously, prior or after) to obtain an organic solvent comprising both, the carrier and the vinyl acetal derivative polymer binder and then, the antimicrobial(s) is (are) mixed to that carrier/binder solvent solution. In another particular embodiment, the antimicrobial(s), the carrier and the vinyl acetal derivative polymer binder are all mixed concomitantly with the organic solvent. In embodiments, the mixing is carried out for about 2 to about 3 hours at room temperature.

In embodiments, the methods above further comprises mixing one or more additive as defined hereinbefore.

ii) Compositions Comprising a Binder Polymer/Solvent

Another aspect of the invention concerns methods for preparing a clear coating antimicrobial composition comprising a binder polymer/solvent, as defined hereinbefore.

In accordance with one embodiment, the method comprises mixing at least one antimicrobial and a binder polymer/solvent to obtain a soluble clear coating antimicrobial composition. In embodiments, the binder polymer/solvent is selected from the group consisting of an acrylic acid polymer, a polyester-based polymer, and an epoxy-based polymer.

In embodiments, the method further comprises mixing to solubilization a carrier, including but not limited to a carrier is selected from the group consisting of cellulose polymers, acrylic polymers, glycol polymers, polyvinyl alcohols, pyrrolidones and mixtures thereof, as defined hereinbefore.

In embodiments, the method further comprises adding to the composition a thermoset hardener such as MEKP (methyl ethyl ketone peroxide) or the like, to initiate polymerization of the composition and to create a hard film when coated on a surface. Although typically not required when using an acrylic acid polymer such as methyl methacrylate, it is typically required when using a polyester-based polymer or an epoxy-based polymer In embodiments, the method further comprises mixing one or more additive as defined hereinbefore.

iii) Additional Information

It is within the skills of those in the art to make proper selections and combinations of the antimicrobial(s), organic solvent(s), vinyl acetal derivative polymer binder(s), binder polymer/solvent(s), carrier(s) (if any) and additives (if any). The skilled persons are also able to determine the proper concentrations, ratios, mixing order, mixing speed, mixing time, etc. in accordance with the desired properties of the final coating and intendant uses.

For instance, the Exemplification section describes particular examples where optimal results were obtained when (i) ethanol and n-butanol or (ii) ethanol and diacetone alcohol or (iii) isopropanol (2-propanol) and n-butanol or (iv) isoproposanol and diacetone alcohol were used in 84:16 ratio (bringing the total weight percent of ethanol to about 79% in the final formulation). In accordance with the present invention, this particular solvent combination not only provided a suitable clear coating formulation with right consistency, is also imparted superior antimicrobial efficacy.

The Exemplification section also provides particular examples in which either ethanol or 2-propanol was used with n-butanol or diacetone alcohol and where the amount of ethanol or 2-propanol was in the range of 70-95% w/w, and the % w/w of n-butanol or diacetone alcohol was adjusted accordingly. Additionally, as reported in Table 1A herein above, the present invention encompasses embodiments wherein only ethanol or only 2-propanol or diacetone alcohol is used as the organic solvent. Additionally, as reported in Table 1B herein above, the present invention encompasses embodiments wherein the solvent can be omitted due to the use of a suitable binder polymer/solvent.

Similarly, the Exemplification section describes particular examples where optimal results were obtained when using polyvinyl butyral in an appropriate solvent system. The skilled persons will be able to discard undesirable selections and/or combinations, for instance mixtures resulting in a coating that is not transparent, that peel off easily and/or becomes sticky.

Similarly, the Exemplification section describes particular examples where an acrylic acid polymer, a polyester-based polymer, and an epoxy-based polymer were used as the binder polymer/solvent.

Commercial Applications

A large variety of articles of manufacture articles may benefit from a coating with an antimicrobial clear coating composition as defined herein. These include, but are not limited to, walls (e.g. having a painted surface or not), plastics, polymers, steel, glass, wood, ceramic, concrete, paper, cellulose, foams, fibers, filters, leather, etc. For instance, articles can be coated/treated/incorporated with an antimicrobial clear coating composition as defined herein to confer desirable antimicrobial activity to these articles.

In embodiments, polymers, especially thermoplastics, thermosets and elastomers are coated or treated with the antimicrobial clear coating of the invention. For example, the invention may be applicable to a wide range of polymers such as, but by no means limited to, biopolymers, inorganic polymers, organic polymers, conductive polymers, copolymers, fluoropolymers, phenolic resins, polyketones, polyesters, polyolefins (polyalkene), rubber, silicone, silicone rubber, superabsorbent polymers, synthetic rubber, vinyl polymers and the like could be coated or treated or even infused with the antimicrobial clear coating of the invention.

In embodiments, steels, especially carbon steels, alloy steels, tool steels, stainless steels, ferric steels, martensitic steels are coated or treated with the antimicrobial clear coating of the invention. For example, the invention may be applicable to wide range of steels such as mild or low carbon steels, medium carbon steels, high carbon steels, ultra-high carbon steels, could be coated or treated with the antimicrobial clear coating of the invention.

Ceramics, especially porcelain, bone china, earthenware, stoneware, glass ceramics, fired bricks ceramics, carbon ceramics, silicon ceramics, silicon carbide ceramics, titanium carbide ceramics, tungsten carbide ceramics, barium titanate ceramics, boron carbide ceramics, bioceramic, ceramic matrix composites, ceramic foam, and ferrite, etc. could be coated or treated with the antimicrobial clear coating of the invention.

In embodiments wood, including all types of hardwood varieties and softwood varieties could be coated or treated with the antimicrobial clear coating of the invention. For example, the invention may be applicable to a wide range of wood varieties such as walnuts, mahogany, maple, oak, rosewood, cherry, cedar, pine, fir, hemlock, spruce, teak, poplar, etc. Moreover, the invention may be applicable to a wide variety of lumber, for example, AC plywood, CDX plywood, cedar, cherry, dimensional lumber, Douglas fir, EWP, hardboard, hardwood plywood, hem fir, LVL, maple, MDF, oak, OSB, pine, plywood, poplar, SPF lumber, treated lumber, and underlayment, etc.

In embodiments, glass of all types can be coated or treated with the antimicrobial clear coating of the invention. For example, the invention may be applicable to annealed glass, heat-strengthened glass, tempered or toughened glass, laminated glass, insulated glass, low-iron/extra clear glass, coated glass, decorative glass, and acid-etched glass.

In embodiments, concrete all types can be coated or treated with the antimicrobial clear coating of the invention. For example, the invention may be applicable to modern concrete, high-strength concrete, high-performance concrete, ultra-high-performance concrete, stamped concrete, self-consolidating concrete, shotcrete and limecrete, cellular concrete, cork-cement concrete, roller-compacted concrete, glass concrete, asphalt concrete, nanoconcrete, polymer concrete, geopolymer concrete, refractory cement, and gypsum concrete.

Additionally, fiber reinforcement, especially various types of fiberglass, aramid, carbon, high modulus polyester, diolen, vectran, could be coated or treated with the antimicrobial clear coating of the invention.

Additionally, metals, such as copper, the iron (wrought or cast), aluminum, magnesium, copper, brass, bronze, zinc, and various types of metal alloys, etc. could be coated or treated with the antimicrobial clear coating of the invention.

In embodiments, visual and/or physical observation of the consistency and/or homogeneity of the clear coating formulation may be tested after spraying on any surface to determine the degree of adhesion, e.g., to determine if additional polymer binder and/or carrier is required.

Additional related aspects of the invention concerns methods for conferring antimicrobial activity to a surface, and particularly the uses of the clear coating antimicrobial composition as defined herein for conferring antimicrobial activity to an article of manufacture and/or for providing antimicrobial activity to a surface.

In embodiments, the antimicrobial clear coating could be applied in a substantially liquid format, for example, as a spray or by a brush or by a roller, such that the antimicrobial clear coating dries on the applied surface. In embodiment, the surface is left to dry for 2 minutes to 1 hour, or about 2 minutes, or about 5 min., or about 10 min., or about 15 min., or about 30 min., or about 1 hour, or about 90 min., or about 2 hours, or about 12 hours, or about 24 hours or more. It may be preferable to apply the composition more than one time for better results.

Surfaces that may be coated with the compositions of the invention include, but are not limited to, furniture, partition curtains, handrails, doors, doorknobs, walls, floors, elevators, air vents, air filters, medical equipment, food processing equipment and materials, slaughterhouse, processing equipment and materials, etc.

For instance, the antimicrobial clear coating composition may be applied to surfaces in a care setting, such as a hospital or care home or another similar facility where microbes may be found in greater quantity or where residents are more fragile to getting sick. In these environments, many different types of surface may benefit from being contacted with the antimicrobial clear coating of the invention, particularly surfaces with which patients or other individuals may touch with their hands, which may in turn, result in an infection for the individual and/or spread an infection to other individuals. Examples of such surfaces include, but are not limited to, furniture such as chairs, walls, bedside tables and the like, handrails, doors and doorknobs, medical equipment, structural elements within a care facility relating to the building itself and/or its construction such as walls, floors, elevators and the like, as well as parts of the heating and air system, for example, air vents, air filters and the like, thereby severely curtailing the spread of infective agents such as bacteria. In one particular embodiment, the antimicrobial clear coating material is used in vents and/or air filters for avoiding spread of airborne microbes, thereby preventing issues such as "sick building syndrome" from developing.

The antimicrobial clear coating composition of the invention also be used in other types of facilities and environments including but not limited to, academic, industrial, institutional, biotechnology, pharmaceutical, commercial, residential, healthcare, defense, transport, agribusinesses, etc.

Performance of the antimicrobial clear coating composition, and/or antimicrobial activity of a surface contacted with same may be assessed with any suitable technique or device including, but not limited to antimicrobial efficacy testing, or using a handheld FTIR spectroscope or handheld ATP meter. Specifically, regarding the use of a handheld FTIR spectroscope as long as antimicrobials are present in the coated surface, they will show distinct peaks in the FTIR spectra. Based on the presence and intensity of these peaks, the presence and quantity of respective antimicrobials in the coating can be estimated.

The antimicrobial efficacy on the coated surface could be evaluated with an ATP meter or a luminometer. The presence and quantity of bacteria on a surface can be determined using a luminometer. A luminometer is an instrument which is capable of detecting minor amount of light emitting from a sample and providing an arbitrary numerical output value for said light. A luminometer can be used to determine the number of bacteria on a surface by swabbing a surface with a test strip specifically designed for use with a luminometer. Once a surface has been swabbed a small chamber of luciferase enzyme solution is cracked and introduced to the swab. The luciferase enzyme chemically binds to the cellular adenosine triphosphate (ATP) from the bacteria, resulting in bioluminescence, which is detected by the luminometer. The degree of bioluminescence is directly proportional to the amount of ATP, and hence bacteria, present on a sample. Results are given in relative light units (RLU), with larger RLU values signifying higher amounts of ATP (and hence bacteria) present on a sample.

Kits

A further related aspect of the invention concerns kits. The kits of the invention may be useful for practicing of the methods of the invention, particularly for providing antimicrobial activity to a surface.

According to one particular aspect, the invention relates to a kit for providing antimicrobial activity to a surface, the kit comprising the clear coating antimicrobial composition as defined herein, and at least one additional component including, but not limited to, a user manual or instructions, an aerosol spray bottle, a spray bottle with a finger sprayer, a mixing bottle, pen(s), marking sheets, boxes, holders, wipes, and cleaning solutions.

According to another particular aspect, the invention relates to a kit for providing antimicrobial activity to a surface, the kit comprising: (i) a clear coating antimicrobial composition as defined herein comprising a binder polymer/solvent selected from the group consisting of an acrylic acid polymer, a polyester-based polymer, an epoxy-based polymer, and mixtures thereof; and (ii) a thermoset hardener to initiate polymerization of the coating antimicrobial composition prior to coating on a surface. According to that embodiment, the two components of the kit are provided in separate containers and their content is mixed when ready to use (i.e. prior to coating a surface).

In the kit, the antimicrobial clear coating composition may be provided as a ready to use formulation. The antimicrobial clear coating formulation may also be formulated as a concentrate for dilution prior to use.

Those skilled in the art will recognize, or be able to ascertain, using no more than routine experimentation, numerous equivalents to the specific procedures, embodiments, claims, and examples described herein. Such equivalents are considered to be within the scope of this invention, and covered by the claims appended hereto. The invention is further illustrated by the following example, which should not be construed as further or specifically limiting.

Example 1

A series of experiments were carried out for demonstrating the feasibility and antimicrobial activity of the clear coating antimicrobial compositions as defined herein. Unless stated otherwise, all the ingredients such as polymer binder, carrier material, and antimicrobials are added in grams per liter.

Materials

Quaternary ammonium compounds were purchased from Health Canada and EPA registered sources. Polyvinyl butyral and other polymer binders, ethyl cellulose were purchased from Sigma Aldrich. The active components of clear coating formulation were analyzed by HPLC and volumetric titration methods. The coated surfaces were analyzed using Scanning Electron Microscopy (SEM), Contact Angle Measurement and Confocal Microscopy.

Formulations

Formulation-1 (#P1) was prepared as follows. Initially ethylcellulose and the quaternary ammonium compound ADBAC (i.e. N-alkyl (40% $C_{12}$, 50% $C_{14}$, 10% $C_{16}$) dimethylbenzylammonium chloride) were dispersed into an ethanol and n-butanol solvent system and allowed to stir for 30 min to 2 hours at room temperature. Then polyvinyl butyral was added and stirred thoroughly for 1-2 h for complete mixing. After appropriate mixing, other additives such as sodium benzoate, sodium dodecyl sulfate, levelling and deodorizing agents were added to the resulting mixture and allowed to stir further for 30 minutes.

Formulation-2 (#P2) was prepared as follows. Initially, ethylcellulose and antibiotic such as chlorhexidine were dispersed into an ethanol and n-butanol solvent system and allowed to stir for 30 min to 2 hours at room temperature. Then polyvinyl butyral was added and stirred thoroughly for 1-2 hours for complete mixing. After appropriate mixing, the other additives such as sodium benzoate, dodium dodecyl sulfate and levelling agents were added to stir for 30 minutes.

Formulation-3 (#P3) was prepared as follows. Initially, ethylcellulose and antibiotic combination such as chlorhexidine and neomycin were dispersed into an ethanol and n-butanol solvent system and allowed to stir for 30 min to 2 hours at room temperature. Then polyvinyl butyral was added and stirred thoroughly for 1-2 hours for complete mixing. After appropriate mixing, the other additives such as sodium benzoate, dodium dodecyl sulfate and levelling agents were added to stir for 30 minutes.

Formulation-4 (#P4) was prepared as follows. Initially ethylcellulose and quaternary ammonium compounds were dispersed into an ethanol and diacetone alcohol solvent system and allowed to stir for 30 min to 2 hours at room temperature. Then polyvinyl butyral was added and stirred thoroughly for 1-2 h for complete mixing. After appropriate mixing, other additives such as sodium benzoate, sodium dodecyl sulfate, levelling and deodorizing agents were added to the resulting mixture and allowed to stir further for 30 minutes.

Formulation-5 (#P5) was prepared as follows. Initially, ethylcellulose and quaternary ammonium compounds were dispersed into a methyl methacrylate polymer/solvent system and allowed to stir for 30 min to 2 hours at room temperature. After appropriate mixing, the other additives such as sodium benzoate, sodium dodecyl sulfate and levelling agents were added to stir for 30 minutes.

Formulation-6 (#P6) was prepared as follows. Initially, ethylcellulose and quaternary ammonium compounds were dispersed into polyester resin and stirred thoroughly for 1-2 hours for complete mixing. After appropriate mixing, the other additives such as sodium benzoate, sodium dodecyl sulfate and levelling agents were added to stir for 30 minutes.

Formulation-7 (#P7) was prepared as follows. Initially, ethylcellulose and quaternary ammonium compounds were dispersed into liquid epoxy resin and stirred thoroughly for 1-2 hours for complete mixing. After appropriate mixing, the other additives such as sodium benzoate, dodium dodecyl sulfate and levelling agents were added to stir for 30 minutes.

Coating Studies:

It is highly desirable for a surface coated or treated with an antimicrobial coating to withstand high scrub resistance to display antimicrobial efficacy even after repeated scrub or wipe cycles. This would demonstrate the durability level of the coated surfaces. As shown herein, the present invention exhibits such desirable properties of longevity and durability.

An array of 5×5 cm acrylic surfaces were spray coated and/or brush coated with P1 clear coating formulation as defined above. It was observed that P1 dries within few minutes. It was observed that P1 coated surfaces were stable to wipe testing.

Surface Analysis and Scrub Resistance Studies

Scrub resistance testing on samples of P1 applied to squares of polymethyl methacrylate (PMMA) was performed to determine the long-term stability of P1 coatings. Scrub resistance testing is performed to simulate numerous washing cycles in an accelerated manner, which is then followed up with the analysis of the coatings to determine whether the coating has been damaged or removed from the surface.

Scrub Resistance Studies

The norm ISO 11998 describes the test protocol for testing wet scrub resistance and cleanability of coatings. The test offers the potential to verify the ability of a coating to withstand the wear caused by repeated cleaning operations. The norm describes two methods: wet scrub resistance and cleanability:

Wet scrub resistance: used for coatings and paints in which the wet scrub resistance is calculated from the loss of thickness of the coating or paint. A Scotch Brite™ (3M) pad and washing liquid is used.

Cleanability: number of soiling agents are placed on the substrate and soiled surfaces are exposed to a defined number of wet scrub cycles.

Scrub resistance was performed by using a TQC™ Scrub Abrasion and Washability Tester, following the ISO 11998 standard. Samples were scrubbed for either 500, 1000, or 2000 scrub cycles before analysis. On average, the instrument can perform approximately 37 scrubs per minute.

Contact Angle Measurements

The contact angle is the measurement of the angle between a surface and a drop of water sitting on the surface. The contact angle reveals the surface chemistry/composition of a given surface. The angle can be between 0 and 180 degrees. High energy surfaces with contact angles between 0 and 90 degrees, the surface is considered hydrophilic, and low energy surfaces with a contact angle above 90 degrees are considered hydrophobic in nature (Statistical contact angle analyses with the high-precision drop shape analysis approach: Basic principles and applications, Heib, F. and Schmitt, M. *Coatings.* 6, 4, 57 (2016).

Contact angle measurements were performed both on a blank PMMA substrate (no coating), and on the P1 coatings after 500, 1000, and 2000 scrub cycles. Blank PMMA substrate and P1 coated samples were expected to have differing contact angles. If the P1 coating were to be removed or destroyed during the scrub resistance testing, the contact angle would change and trend back towards the contact angle of the blank, uncoated PMMA substrate.

The results of the contact angle measurements are shown in Table 2, the table comprising data of triplicate measurements. The contact angle of the blank, uncoated PMMA substrate was approximately 75 degrees, whereas the contact angle of coated, P1 coated surface films were approximately 50 degrees even after 500 scrubs cycle (the contact angle measurement of the P1 coating was not measured before any scrub cycles and is expected to be near 50 degrees, based on these results). It is only after 2000 scrubs cycle that the angle of the P1 coating increases toward the control value for the uncoated substrate (approximately 68 degrees for 2000 scrub cycles versus 75 degrees for the PMMA blank substrate). This suggests that at least some of the P1 coating has been removed during the 2000 scrub cycles.

TABLE 2

| Contact angle measurements of surface coated with P1 after 500, 1000, and 2000 scrub cycles | | | | | | | |
|---|---|---|---|---|---|---|---|
| Blank | | 500 | | 1000 | | 2000 | |
| CA left | CA right | CA left | CA right | CA left | CA right | CA left | CA right |
| 1 | 76.1 | 77 | 53.4 | 55.4 | 51.8 | 50.7 | 68.9 | 68.5 |
| 2 | 74.4 | 74.8 | 51.1 | 51.3 | 48.9 | 48.8 | 68.3 | 67.7 |
| 3 | 73.3 | 72.2 | 53.4 | 52.3 | 48.8 | 48.5 | 68.6 | 68.1 |
| Average | 74.6 | 74.7 | 52.6 | 53.0 | 49.8 | 49.3 | 68.6 | 68.1 |

CA left = Contact angle measured of the left side of the droplet
Ca right = Contact angle measured of the right side of the droplet Calculating Coatings Longevity Based on these positive scrub resistance results, it may be possible to estimate the duration of a clear antimicrobial coating in accordance with the present invention. For the sake of example, such calculations were done using a value of 1000 scrubs cycles, since the contact angle measurements remained the lowest even after such extensive scrubbing.

It can be expected that the duration for 1000 scrub cycles will be dependent on a number of assumptions. The following assumptions were applied to calculate the longevity of the P1 coating:

a hospital surface is cleaned once daily;

an average cleaning involves approximately 4 wipes with a microfibre cloth and mild detergent; and a scrub cycle is defined as one complete back and forth movement (hence 4 wipes of a cloth constitutes 2 scrub cycles).

The number of scrub cycles in a year can be calculated as follows:

$$\# \text{scrub cycles} = (\text{number of cleanings in a day})(2 \text{ scrub cycles per cleaning})(\text{number of days})$$
$$= (1 \text{ cleaning a day})(2 \text{ scrub cycles per cleaning})(365 \text{ days})$$
$$= 730 \text{ scrub cycles in a year}$$

The number of days in 1000 scrub cycles can be calculated as follows:

$$\# \text{of days} = (\# \text{ of scrub cycles})/[(\text{number of cleanings a day})(2 \text{ scrub cycles per cleaning})]$$
$$= (1000 \text{ scrub cycles})/[(1 \text{ cleaning a day})(2 \text{ scrub cycles per cleaning})]$$
$$= 500 \text{ days}$$

Therefore, using these assumptions, it can be estimated that a surface coated with composition P1 will maintain its antimicrobial efficacy for 500 days worth of cleaning cycles. This translates to 1 year, 4 months, 13 days.

It is also worth noting that the conditions of the scrub-resistance testing are possibly being more extreme than what would be found during a standard cleaning protocol in a hospital or other public place. Indeed, the scrub resistance testing was performed with a mildly abrasive sponge, which may be harder/more destructive than a microfibre cloth.

For high-contact or high-risk surfaces, which may be washed several times a day (e.g., surgery rooms, washrooms, etc.) it may be recommended applying the coating more frequently than once a year (e.g., two, three, or four times or more). As an example, increasing cleanings per day from 1 to 4 will reduce the duration of the film from 500 days to 125 days (approximately 4 months).

Confocal Microscopy

Simple confocal microscopy was performed to visually show the P1 coated surface before and after the scrub cycles, compared to the PMMA blank substrates. The results are shown in FIG. 1 and FIG. 2.

As shown in FIG. 1, the PMMA blank substrate is very rough and full of scratches. This is to be expected as we physically roughen the surface using sandpaper before the application of P1 to promote adhesion to the PMMA substrate. The P1 coated surfaces after 500 scrub cycles is fairly smooth, with only minor scratching. More visible scratching and pitting is seen in the 1000 and 2000 scrub cycle coatings.

Figure 2:
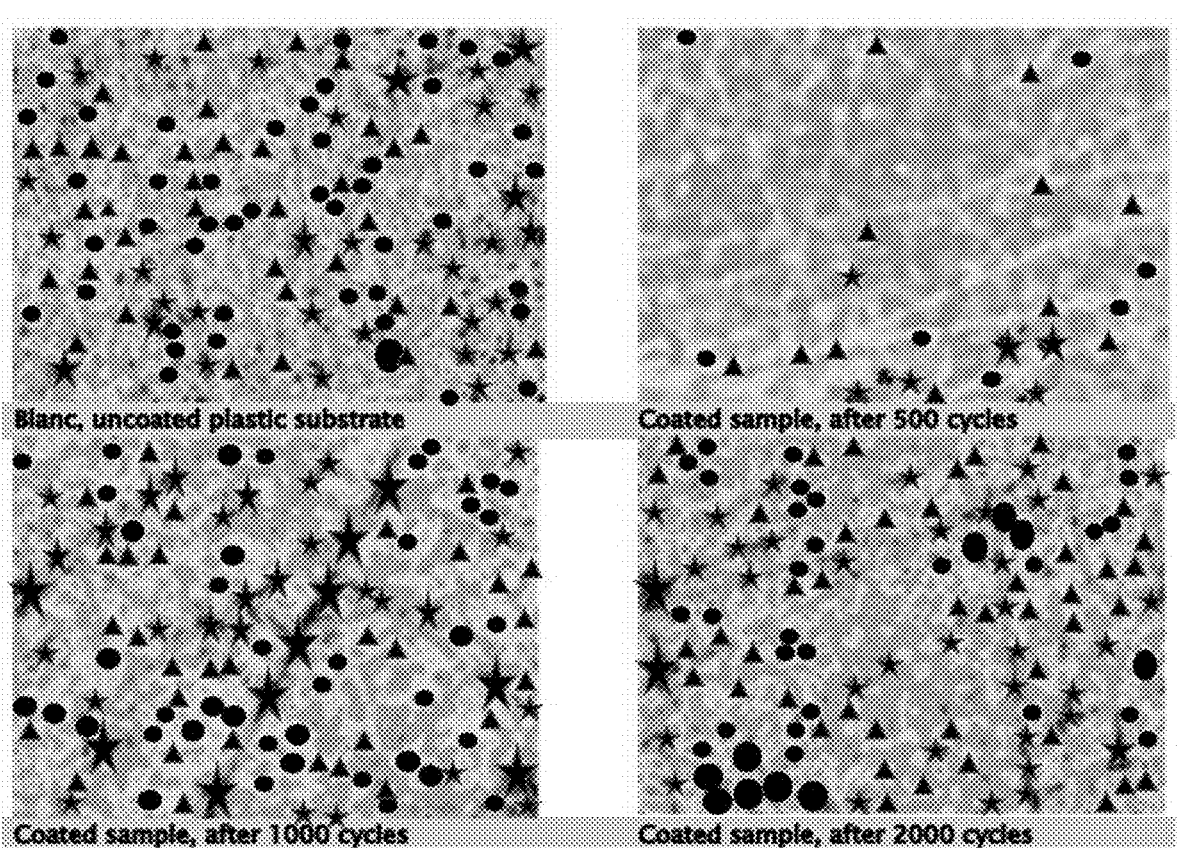
FIG. 2 is a panel showing enhanced confocal microscopy images of the images of FIG. 1. Star shapes indicate low points, circle shapes indicates high points, with a trend of star shapes to triangle shapes, gray colour (background color) and then to circle shapes with increasing height.

As shown in FIG. 2, five hundred cycles show a typically uniform surface coating. One thousand cycles are showing more distress to the surface, with an increase in star shapes features indicating possible abrasion lines being formed as parts of the coating are removed. Two thousand cycles are showing much more circles shapes high points on the topography, which were not as prevalent in the 500 or 1000 cycle surfaces. High height profiles are more noticeable in the uncoated PMMA blank sample, which could possibly indicate substantial loss of the coating composition from the surface after 2000 scrub cycles.

As mentioned hereinbefore, contact angle measurements showed a stable contact angle at 500 and 1000 scrub cycles, with 2000 scrub cycles giving a contact angle closer to the blank substrate than the P1 coating. This suggests at least some destruction of the P1 coated film after 1000 scrub cycles or more. Confocal microscopy showed an increased surface roughness at 1000 and 2000 scrub cycles, indicating possible removal of P1 coating from the substrate. Based on several assumptions outlined in this document, these results confirm that the P1 coating is stable and active for at least 1000 scrub cycles, which is the calculated equivalent of about 500 days, or 1 year, 4 months, 13 days.

Evaluation of Antimicrobial (AM) Efficacy of Treated (Coated) Hard Surfaces

The testing protocols most commonly used to test antimicrobial (AM) efficacy of coated surfaces are Japanese industrial standard JIS Z 2801:2000 (E):2000 8S [2] or the International Organization for Standardization (ISO) protocol 22196 (ISO22196, Plastics—Measurement of antibacterial activity on plastics surfaces: International Standard; 2007). JIS Z 2801 protocol is a sensitive method to test AM activity and can be used in hospitals or household settings.

JIS Z 2801:2000 (E):2000 8S: The method is the most commonly chosen test and has become the industry standard for antimicrobial efficacy of non-porous hard surfaces. As mentioned above, the test has been adopted by ISO 22196 and has become the standard for industrial AM efficacy testing. JIS Z 2801 test is reproducible and can test both bacteriostatic and bactericidal properties. In addition, this test allows bacteria access to nutrients and ensures that they don't dry out, which makes the AM efficacy a direct result of the AM surface rather than stress factors that may play a role in microbial killing in protocols where the bacteria are in non-nutritive solution or are dried on a solid surface. The test organisms are grown in liquid media (LB) and applied on test and control surfaces in a diluted nutrient solution. This allows for the possible growth of test organisms during the incubation period/contact time. Following the incubation, the surfaces are washed, serial diluted, and plated on Mueller Hinton Agar (MHA) plates.

Microbial Methods

Bacterial cultures were diluted in 0.85% saline for a densitometry check and determination of the number of colony forming units (CFUs). The saline diluted cultures were supplemented with 1 in 500 of Mueller Hinton broth (MHB) and were directly applied (initial inoculum) on the test and control surfaces (400 μL containing $1\times10^8$ test organisms) placed in sterile petri plates. The difference between the test and control surface is the AM coating. A clear film was placed slowly on the surface above the bacterial sample to allow an even spread of the culture and contact with the surface. The petri plates with the surfaces were placed in a humid box and incubated at 37° C. for 24 hours, following which the surfaces were washed with 0.85% saline, serial diluted and plated on MHA plates. The MHA plates were incubated at 37° C. for 24 hours and CFU/mL were counted and R (fold reduction in CFU on the test surface compared to the control surface in Log 10 scale) value calculated. Majority of the antimicrobial data obtained are based on evaluations after 2 hours of incubation time. As prescribed, triplicates of test and control surfaces were evaluated and the efficacy is reported as R-value (as mentioned above) and % reduction (microbial kill on test surface compared to control surface).

The antimicrobial efficacy (both antibacterial and antifungal) of P1 coated samples were tested against 13 bacterial strains and two fungal strains using JIS Z 2801 protocol. For the majority of the strains AM evaluation was performed after 2 hours of contact time. The R-value represents the Log 10 of difference in total CFU count between control and the test surface. The % reduction shows a difference in total CFU count between control and test surface as a % of total CFU count of the control surface.

TABLE 3

| Antibacterial efficacy of P1 | | |
|---|---|---|
| Bacterial strain | Antimicrobial Activity (R) (Log B-C) | Microbial Kill* (% Reduction) |
| Vancomycin Resistant Enterococcus faecalis AATCC 51299 | >4.49 | >99.99 |
| Clostridium perfringens ATCC 13124 | >4.33 | >99.99 |
| Acinetobacter baumannii ATCC 19606 | >4.33 | >99.99 |
| Proteus mirabilis ATCC 14153 | >4.38 | >99.99 |
| Shigella flexneri ATCC 9199 | >4.38 | >99.99 |
| Bacillus subtilis ATCC 6633 | 3.02 | 99.90 |
| Corynebacterium minutissimum ATCC 23348 | >4.34 | >99.99 |
| Enterobacter aerogenes ATCC13048 | >4.38 | >99.99 |
| Escherichia coli ATCC 8739 | >4.42 | >99.99 |
| Klebsiella pneumoniae ATCC 700603 ESBL strain | >4.43 | >99.99 |
| Listeria monocytogenes ATCC 2307 | >4.34 | >99.99 |
| Methicillin-Resistant Staphylococcus aureus ATCC 43300 | >4.36 | >99.99 |
| Serratia marcescens ATCC 14756 | >4.36 | >99.99 |

*% reduction in microbial CFU (colony forming units)

TABLE 4

| Antifungal efficacy of P1 | | |
|---|---|---|
| Fungal strain | Antimicrobial Activity (R) (Log B-C) | Microbial Kill* (% Reduction) |
| Aspergillus flavus ATCC 9643 | >4.09 | >99.99 |
| Candida albicans ATCC 10231 | >4.32 | >99.99 |

*% reduction in microbial CFU (colony forming units)

As reported earlier, the data in Tables 3 and 4 were obtained from tests using JIS Z 2801 protocol. The initial inoculum (at the start of the experiment) for bacterial and fungal strains applied on test and control surfaces were between $1.0 \times 10^5$ to $1.5 \times 10^5$. Antimicrobial efficacy of the above two fungal strains and two bacterial strains (vancomycin resistant Enterococcus faecalis AATCC 51299, Clostridium perfringens ATCC 13124) were evaluated after 24 hours of incubation P1 coated surface. For rest of the bacterial strains, the contact time for AM efficacy evaluation was 2 hours. Microbes listed above mostly include pathogenic bacteria, one non-pathogenic (B. subtilis) and pathogenic fungi. Although the majority of the strains were Gram −ve, four Gram +ve strains were included as well. These strains pose a range of health challenges, including multi-drug resistance, major HAI, urinary tract infection (UTI), skin infection and food poisoning.

As evident from Tables 3 and 4, P1 coated surfaces were able to reduce the microbial number by >99.99% for all strains except one (99.90% for Bacillus subtilis ATCC 6633). Considering for majority test organisms above the contact time was 2 hours, this data clearly demonstrates excellent AM activity of P1 coated surfaces compared to control, uncoated surfaces.

Aspergillus flavus is responsible for invasive aspergillosis in humans. It ranks 5th in the list of top 10 most feared fungi because of human diseases, in several crops pre- and post-harvest diseases and aflatoxin-related toxicities in humans and animals [Hyde K. D., et al. Fungal Divers. 2018; 9:161-194. doi: 10.1007/s13225-018-0413-9.]. Candida albicans, the second fungal strain tested, is one of the most prevalent causes of fungal infections in humans [Berman, J. Candida Albicans. Current Biology. Volume 22, issue 16, PR620-R622, Aug. 21, 2012.]. In addition to excellent antibacterial activity, P1 coating demonstrated equally good (microbial killing >99.99%) antifungal activity against these two fungal pathogens (Table 3).

The excellent AM efficacy data obtained for P1 coated surfaces were reiterated by data resulting from the JIS Z 2801 tests against two bacterial and a fungal strain. The data obtained are presented in Table 5.

TABLE 5

| Confirmation of antimicrobial efficacy of P1 | | |
|---|---|---|
| | Antimicrobial Activity (R) (Log B-C) | Microbial Kill (% Reduction) |
| Bacterial strain | | |
| Pseudomonas aeruginosa ATCC 15442 | 5 | 99.999 |
| Staphylococcus aureus ATCC 6538 | 4.5 | 99.99 |
| Fungal strain | | |
| Trichophyton mentagrophytes ATCC 9533 | 3.9 | 99.98 |

Both Pseudomonas aeruginosa and Trichophyton mentagrophytes are pathogenic bacteria, regularly demonstrating multi-drug resistance. They are known to cause a host of human diseases, including pneumonia, meningitis, urinary tract infection, gastrointestinal infection, sepsis and skin/soft tissue infection. So, the % reduction of >99.99 against these pathogenic bacteria demonstrated by P1 coated surface clearly shows the antibacterial efficacy (Table 5). In addition to the antibacterial property, P1 coated sample surface demonstrated excellent antifungal property (% reduction of >99.98) against Trichophyton mentagrophytes, a pathogenic fungi known to cause ringworm in companion animals (Table 5).

Evaluating Antimicrobial (AM) Activity of P1 Coated Surfaces Through Multiple Bacterial Challenges An experiment was designed to evaluate AM efficacy of P1 coated surfaces after multiple bacterial challenges. JIS Z 2801 tests were conducted five times on the same PNI279 surfaces, each time following a challenge of $1 \times 10^8$ test organisms. A 24-hour contact time of test organisms to the PNI 279 surface was allowed for each of the five microbial challenges. After completion of a JIS Z 2801 test, which includes washing the test and control surfaces with 20 ml of 0.85% saline solution to dislodge the test organisms, the surfaces were rinsed well with MiliQ™ water and air-dried.

The air-dried surfaces (PNI 279 and control) were subjected to the next cycle of the challenge with test organism followed by a JIS Z 2801 test. AM efficacy against two test organisms, Methicillin-Resistant *Staphylococcus aureus* ATCC 43300 and *Escherichia coli* ATCC 8739 were evaluated.

TABLE 6

Antibacterial activity of P1 coated samples against Methicillin-Resistant *Staphylococcus aureus* ATCC 43300.

| Number of challenges with test organism | Antimicrobial Activity (R) (Log B-C) | Microbial Kill (% Reduction) |
|---|---|---|
| 1 | 5.71 | 99.998 |
| 2 | 5.45 | 99.996 |
| 3 | 5.27 | 99.994 |
| 4 | 6.00 | 99.9999 |
| 5 | 5.80 | 99.999 |

Across all five uses of the P1 coated samples, the % reduction compared to control surfaces against the MRSA strain is >99.999, which testifies the excellent AM activity of P1 coated samples (Table 6). This shows the robustness of the AM coating as it withstood five washing steps involving vigorous shaking with 20 mL of saline solution and later thorough rinsing with MiliQ™ water. In addition, as these experiments were conducted over a period of 4 weeks and the P1 coated samples surfaces were stored on the bench at room temperature in between each JIS Z 2801 tests, redemonstrating the robustness and longevity of the AM activity.

TABLE 7

Antibacterial activity of P1 coated samples against *Escherichia coli* ATCC 8739.

| Number of challenges with test organism | Antimicrobial Activity (R) (Log B-C) | Microbial Kill (% Reduction) |
|---|---|---|
| 1 | 6.50 | 99.9999 |
| 2 | 6.15 | 99.9999 |
| 3 | 6.05 | 99.9999 |
| 4 | 6.20 | 99.9999 |
| 5 | 6.20 | 99.9999 |

Against *E. coli*, the P1 coated samples demonstrated >99.999% reduction (microbial kill %) compared to the control surface in all five of the JIS Z 2801 tests (Table 7). This means no loss in the AM efficacy against test organisms for the five times they were tested. As the AM coated surfaces (P1) used in this study were treated exactly the same as the ones used in the tests against MRSA, the robustness of the coating and longevity in the AM property holds true against this test organism (*E. coli*).
AM Efficacy after Simulated Wear
Next, AM efficacy was measured after subjecting AM coated surface to abrasions that simulates wear in hospitals and community settings. Indeed, high-touched surfaces are likely to wear down because of the high contact and usual cleaning procedures (wiping with detergent and water). 500 and 1000 wiping cycles with 0.25% detergent solution (1 stroke from left to right and completing the cycle with a stroke from right to left) were performed on P1 coated surfaces. The wiping cycles were performed using common household kitchen sponge and, between each wiping cycle, 10 µL of a 0.25% detergent solution (SparkleenT™ 1, Fischer scientific) was applied on AM coated surfaces (4.5×4.5 cm in dimension). After completion of the wiping cycles, the surfaces were rinsed with MiliQ™ water to remove any residual detergent and air-dried. The JIS Z 2801 protocol was then carried out to evaluate AM activity of the surfaces against *Pseudomonas aeruginosa* ATCC 10145. The AM efficacy is represented as R-value and % reduction in the Table 8 below. For this particular study, $1\times10^8$ test organisms were used for each test and control surfaces.

TABLE 8

Antimicrobial activity after wiping with detergent

| Wipe cycles (with 0.25% detergent) | Antimicrobial Activity (R) (Log B-C) | Microbial Kill (% Reduction) |
|---|---|---|
| 500 times | 5.80 | 99.999 |
| 1000 times | 4.60 | 99.99 |

Figure 3:
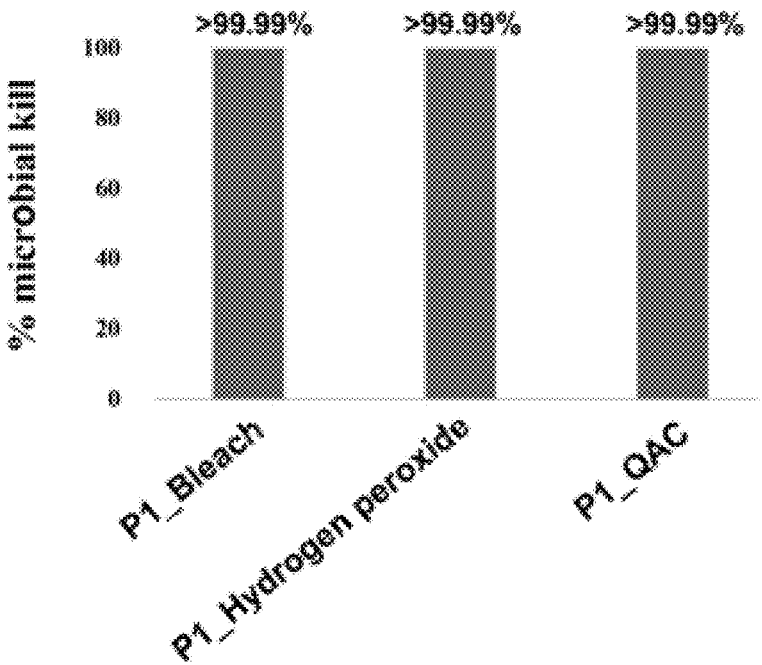
FIG. 3 is a panel with bar graphs showing efficacy of P1 coated surfaces against MRSA ATCC433300, in accordance with Example 1.
Figure 3:
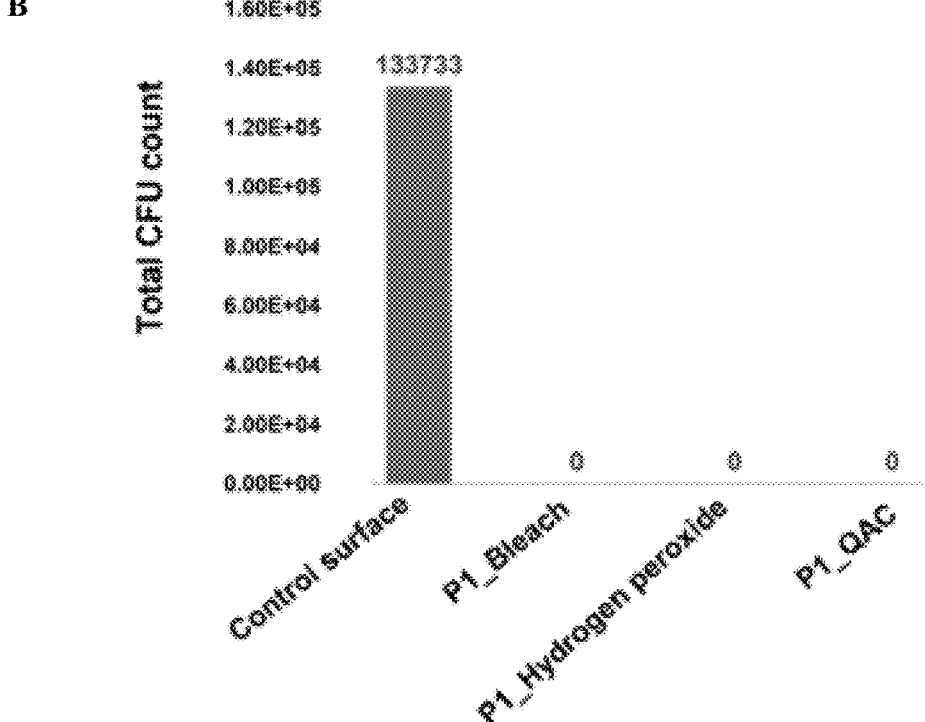

As reported in Table 8, excellent AM efficacy (% reduction >99.99) was measured even after 1000 times of wiping cycles with a detergent, demonstrating the robustness and longevity (i.e., ideal characteristics in a high-touch surface) of the P1 coated surfaces. This data is even more notable as the test organism is *Pseudomonas aeruginosa*, a very common pathogen in Hospital Acquired Infections (HAI) which shows multi-drug resistance and endogenous antimicrobial inactivation [Poole K. *Pseudomonas aeruginosa*: resistance to the max. Front Microbiol. 2:65 10.3389/fmicb.2011.00065.]. In another efficacy study, robustness of P1 coated surfaces (4.5×4.5 cm surfaces) was demonstrated by exposing such a coated surface 20-times to one of the three commercial disinfectants (bleach, hydrogen peroxide and quaternary ammonium compounds based disinfectants), with 50 wipe-cycles after each disinfectant exposure for simulating abrasions. These totals to 1000 wipe-cycles or abrasion exposures were performed manually using a house hold kitchen sponge. After the completion of the wipe-cycles, the surfaces were thoroughly rinsed with distilled water and air dried. Then processed to perform JIS Z 2801 (ISO 22196) protocols to evaluate AM activity of the surfaces against MRSA ATCC43300 using $2.5\times10^5$ bacterial cells for each surface. The AM efficacy is shown in reduction in CFU count and microbial kill % included FIG. 3. The data here represented average of three uncoated (control) and coated (P1 coated) surfaces (three coated surfaces for 20-times exposure to individual disinfectant and 1000 wipe-cycles). The total MRSA ATCC43300 CFU recovered and % microbial kill were calculated. Note: In the CFU count table below, MRSA ATCC43300 is recorded as MRSA. It was displayed that after 1000 wet wipe cycles with 3 hospital grade disinfectants, P1 treated surfaces eliminated >99.999% of CFU of MRSA.
Time Kill Study, Graphs and Explanation:
Most of the AM activity tested and reported above were obtained after 2 hours of contact time. The effectiveness of the antimicrobial activity was further tested by conducting time kill study against two test organisms, Methicillin-Resistant *Staphylococcus aureus* ATCC 43300 and *Escherichia coli* ATCC 8739. The JIS Z 2801 protocol was performed with an initial inoculum of $2.5\times10^5$ test organisms on each surface tested (test and control surfaces) with contact times of 5, 10 and 15 minutes. At the end of the stipulated contact time, the surfaces were washed with 0.85% saline, serial diluted and plated on MHA plates. After 24 hours of incubation at 37° C., CFUs on these MHA plates were counted. The R value and % reduction calculations were done based on the total CFU count from test and control surfaces. The results are reported in Table 9 and Table 10 below.

TABLE 9

| Time kill data of P1 coated samples against Methicillin-Resistant *Staphylococcus aureus* ATCC 43300 | | |
| --- | --- | --- |
| Length of contact time | Antimicrobial Activity (R) (Log B-C) | Microbial Kill (% Reduction) |
| 5 minutes | 0.24 | 41.80 |
| 10 minutes | 1.10 | 92.00 |
| 15 minutes | 2.46 | 99.66 |

TABLE 10

| Time kill data of P1 coated samples against *Escherichia coli* ATCC 8739 | | |
| --- | --- | --- |
| Duration of contact | Antimicrobial Activity (R) (Log B-C) | Microbial Kill (% Reduction) |
| 5 minutes | 0.25 | 43.71 |
| 10 minutes | 2.88 | 99.87 |
| 15 minutes | 2.87 | 99.86 |

The time-kill data presented above in Tables 9 and 10 shows that P1 coated surfaces have fast-acting AM property (with >99% reduction in *E. coli*, >90% reduction in MRSA CFU counts after just 10 minutes of contact time compared to control surfaces. As demonstrated above, 15 minutes of contact time was enough to have >99% microbial reduction, which is an excellent addition to the robustness and longevity in AM activity evaluation reported in the previous section.

Reduction of Biofilm Formation

Bacterial biofilms represent a communal life form compared to free living bacteria, with higher potential to withstand antimicrobial challenges thereby posing greater threat to human health [Flemming, H C., Wingender, J., Szewzyk, U. et al. Biofilms: an emergent form of bacterial life. *Nat Rev Microbiol* 14, 563-575 (2016)]. It's estimated that close to 80% of all microbial infections in humans is biofilm related [Davies, D. (2003). Understanding biofilm resistance to antibacterial agents. *Nat. Rev. Drug Discov.* 2, 114-122. doi: 10.1038/nrd1008].

Figure 4:
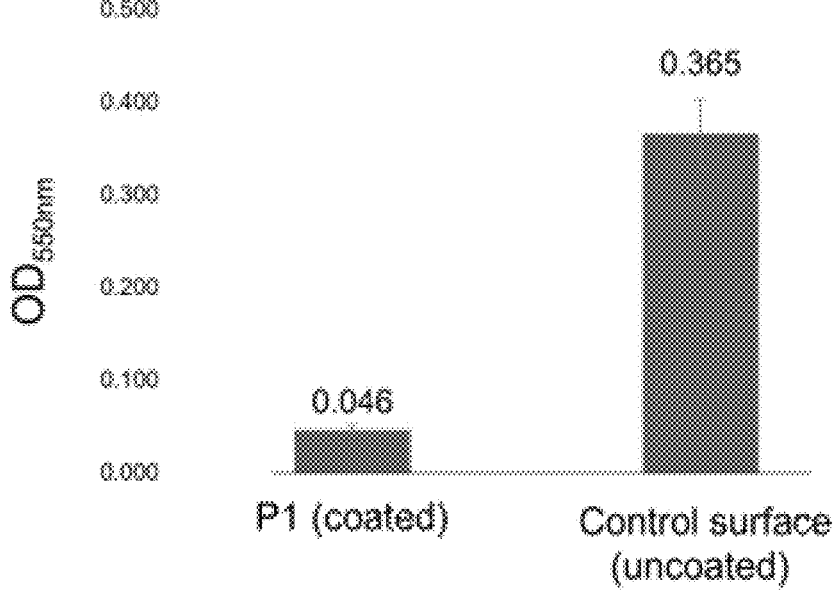
FIG. 4 is a panel with a bar graph and a picture of a 96 well plate depicting efficacy of P1 coated surfaces against biofilms, in accordance with Example 1.
Figure 4:
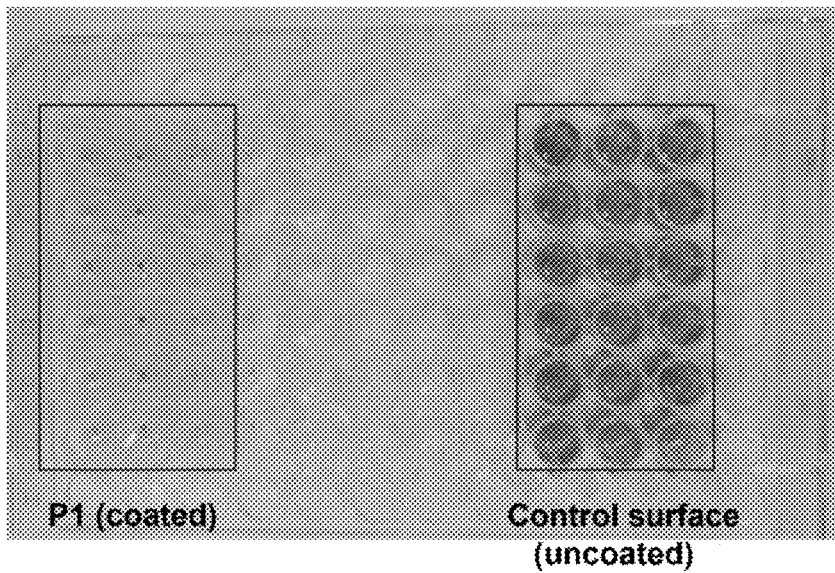

Keeping in view the clinical relevance of strategies to limit biofilm formation, P1 coated surfaces were evaluated for the efficacy against biofilms secreted by pathogens. Using a standard protocol described previously [O'Toole, G. A. Microtiter Dish Biofilm Formation Assay. *J. Vis. Exp.* (47), e2437, doi:10.3791/2437 (2011)], quantified the biofilm formation in P1 coated and uncoated (control) wells in a 96 well plate. Three consecutive rows were sprayed with P1, allowed to sit for 10 minutes following which the plate was tapped multiple times on paper towel to remove any excess antimicrobial spray. The plate was then dried overnight. The next day, 100 μl of 1:100 diluted overnight culture of wild-type *Pseudomonas aeruginosa* (PA01), diluted in M63 minimal media (supplemented with arginine and magnesium sulfate) was pipetted in the P1 coated and uncoated (control) wells. The 96 well plate is placed in a humid box at 37° C. for 24 hours, following which the protocol described by O'Toole was followed. Values plotted below represents OD550 (absorbance at 550 nm) for quantifying wild-type *Pseudomonas aeruginosa* (PA01) biofilm formation after the crystal violet (0.1%) staining. Results of the quantification and an image of the 96 well plate after obtaining OD550 is provided in FIG. 4.

As the above method only give us the comparative colorimetric evaluation at OD550, we designed an experiment to quantify viable bacterial cells present in biofilms with and without applying P1. For this experiment, 1:100 dilution of overnight culture of *P. aeruginosa* (PA01) or MRSA (ATCC 43300) was applied to a column of wells in a 96 well flat-bottomed plate. For PA01, the dilution was performed with arginine and magnesium sulfate supplemented M63 minimal media and for MRSA 43300 the arginine was replaced with glucose and casamino acid. The experiment was performed in three bio-replicates with 100 μl of each diluted culture pipetted into a complete column (8 wells) of a 96 well plate. The 96 well plate is placed in a humid box at 37° C. for 24 hours, after which the bacterial cultures were shaken out with plates upside down and lid off. The plates were then patted on paper towel, subjected to two washes with 150 μl MiliQ™ water for each wash, with patting on paper towel after both washes. The plates were allowed to dry for 15 minutes with lids off. After this step, P1 was sprayed on the 3 columns designated for test and saline (0.4% NaCl) on designated control columns. After a 10-minute incubation, the plates were patted again on paper towel really well to get extra spayed AM spray and saline out. The plates were then placed in 37° C. incubator for 2 hours. We put one plate per bacteria through three washes of neutralization buffer (Synthetic AOAC, Wright and Mundy broth from Himedia™) with 150 μl per wash and patting on paper towel at completion of each wash. This was to allow neutralization of the P1 that may be present in the test wells when dislodging the biofilm step will be carried out. For the other plate, there was no neutralization step and we proceeded to dislodge the biofilm present in the test and control wells. For both the plates, 100 μl solution used for dislodging and also serial dilutions of it (1:10 serial dilutions up to 5 dilutions) were plated on Tryptic Soy Agar (TSA) plates and incubated at in 37° C. for 24 hours, following which the CFU counts were performed. Here we report for both the strains the average total CFU count (CFU count times the dilution factor) and % reduction in viable bacterial count with P1 application for plates subjected to neutralization washes. The antibiofilm study results have demonstrated that P1 coated surfaces eradicated >99.9% of biofilms produced by MRSA ATCC 43300 and *P. aeruginosa* PAO1 bacteria. The data is shown in Table 11.

TABLE 11

| Eradication of biofilms from P1 coated surfaces | | | |
| --- | --- | --- | --- |
| Strains tested | Control surface (uncoated) | P1 (coated) | % Microbial kill |
| MRSA (ATCC43300) | 2160000 | 0 | >99.999 |
| *P. aeruginosa* (PAO1) | 7166666 | 0 | >99.999 |

ISO 21702 Study

As stated by ISO.org, "ISO 21702 specifies proper methods for measuring antiviral activity on plastics and other non-porous surfaces of antiviral-treated products against specified viruses". This is a standard test performed to access antiviral efficacy intended to be commercialized.

Based mainly on two other ISO protocols (ISO 22196 and ISO 18184) ISO 21702 evaluates antiviral efficacy (R-value and % reduction of viral killing). This protocol is based on ISO 22196, which itself is fundamentally very similar to JIS Z 2801. Similar to antibacterial efficacy evaluation by JIS Z 2801, here, antiviral efficacy (reduction in the number of viable viruses) of AM coated non-porous surface compared to a control surface is measured.

The antiviral data below was obtained for P1 coated samples against human coronavirus (strain 229E) at 2 different time points, 2 hours and 24 hours of contact time. The data were generated under GLP conditions.

TABLE 12

| Antiviral data of P1 coated samples against human coronavirus (229E) | | |
|---|---|---|
| Duration of contact | Antimicrobial (antiviral) Activity (R) (Log B-C) | Microbial Kill (% Reduction) |
| 2 hours | 3.00 | 99.90 |
| 24 hours | 3.00 | 99.90 |

Effective Human coronavirus (strain 229E) antiviral activity was demonstrated by P1 after only 2 hours of contact time (% reduction of 99.90) (Table 12). In addition to excellent antibacterial and antifungal efficacy, the antiviral data makes P1 a multifaceted antimicrobial coating product. Considering that the current COVID-19 pandemic is caused by the virus that was tested, the compositions of the present invention have the potential to be at the forefront in the fight against this virus by reducing hospital and community spread.

ASTM E1053E and GLP-ASTM E1053 Studies

American society of testing and materials (ASTM) E1053E protocol defines standard practices to assess the virucidal activity of chemicals used for the disinfection of non-porous materials. This protocol may be used to "determine the effectiveness of liquid, aerosols/foams, and trigger-spray products against designated prototype viruses". The stock virus to be used is thawed and diluted to an appropriate concentration. As per the requirement of the antiviral product being tested (here the P1 formulation was tested in undiluted form) it can be diluted to applicable concentration. An outline of the test protocol can be accessed from the Microchem™ lab website. The protocol can be modified to include various test product applications (spray, wipes, etc.) and conditions. The viral inoculum (at multiple dilutions) is applied and spread over the entire surface of a carrier (a petri dish) and allowed to dry, following which the test product is applied in the form of a spray. After completion of the desired contact time, the viruses from the test and the control (i.e., recovery plates in which no test substances were sprayed) plates are dislodged mechanically, neutralized of any active ingredients (for neutralized tests to obtain viral titer). The same neutralization steps were followed to neutralize an aliquot of the test substance and was used for cytotoxicity test (i.e., a test to assess damage to host cells). In addition, a neutralization control was generated where a low concentration of viral suspension was added to an aliquot of cytotoxicity control. This control was included to confirm the efficacy of the selected neutralization method. The neutralized test, recovery, cytotoxicity control, and neutralization control suspensions were serially diluted in the appropriate media and plated onto host cell monolayers.

Appropriate media was added and host cell-virus mix were incubated for 7 to 10 days. After the incubation time, each tray was examined for cytopathic effect from the viral load using the Spearman-Karber method [Ramakrishan M. A. Determination of 50% endpoint titer using a simple formula. World J Virol. 2016 May 12; 5(2): 85-86], or another appropriate statistical method, used to quantify the amount of infectious virus present in the assay. Cytotoxicity trays were also examined for any adverse effect from the test product. The test results were reported as median tissue culture infectious dose (TCID50) in the Log 10 scale and log (Log 10) reduction in viral load per carrier. The antiviral efficacy of the test carrier compared to the control carrier is reported as TCID50. Note that, for cytotoxicity and neutralization tests, TCID50 per 0.1 mL of host cell/virus suspension has been provided.

The data obtained are presented in Table 13. The success criteria of the ASTM E1053E experiment that was performed are as follows.

Virus recovery control: at least 4-Log 10 infectious units

Complete inactivation of test virus at all dilutions of the assay when challenged by the test antiviral, or, if the neutralized test product cause cytotoxicity, a 3-Log 10 reduction past the cell dilution for which cytotoxicity is observed.

Neutralization controls show similar levels of cytopathic effects shown by neutralization control substances.

TABLE 13

| Reduction of in viral titer for P1 coated surfaces | | |
|---|---|---|
| | Plate recovery control | P1 formulation |
| $TCID_{50}$ per carrier (in Log10) | 5.30 | ≤0.80 |
| Log10 Reduction Per Carrier | N/A | ≥4.50 |
| % reduction (viral kill) | N/A | ≥99.997 |

The results in Table 13 shows ≥99.997% reduction in viral titer for P1 coated surfaces compared to control surfaces. The data here reiterates the excellent antiviral activity reported from GLP experiments conducted using ISO 21702 protocol (in the above section). Together, these two protocols cover both bases of viral spread, i.e., via dry smear and via wet/suspension.

Table 14 below presents the data obtained for cytotoxicity and neutralization aspects of the test substance P1.

TABLE 14

| Cytotoxicity and neutralization of the P1 formulation | | |
|---|---|---|
| | Cytotoxicity test | Neutralization test |
| $TCID_{50}$ per 0.1 mL (Log10) for PNI00307 | ≤0.50 | 3.75 |
| $TCID_{50}$ per 0.1 mL (Log10) for control | N/A | 3.75 |
| Remark | No cytotoxicity observed | Neutralization at par with control |

N/A—not applicable

The data of Table 14 above clearly demonstrates that P1 formulation (in its undiluted form tested in this study) is non-cytotoxic to the cell lines used. In the neutralization test, the TCID50 per 0.1 mL value of 3.75 that was obtained for P1 is equal to that of the control substance, which confirms the efficacy of the neutralization method. Since an efficient neutralization method is one of the success criteria of the protocol, this data attest to the reliability of the reported antiviral activity (% reduction of ≥99.997).

Evaluating antimicrobial (AM) activity of P2 coated surfaces through multiple bacterial challenges: The antimicrobial efficacy (antibacterial) of P2 coated samples were tested against 3 bacterial strains using JIS Z 2801 protocol. For all of the strains AM evaluation was performed after 24 hours of contact time. The R-value represents the Log 10 of difference in total CFU count between control and the test surface. The % reduction shows a difference in total CFU count between control and test surface as a % of total CFU count of the control surface (Table 15).

TABLE 15

| Antibacterial efficacy of P2 coated samples | | | | |
| --- | --- | --- | --- | --- |
| | | #P2 coated surfaces | | |
| Strains tested | Control CFU | CFU | R | % microbial kill |
| P. aeruginosa ATCC 10145 | 4032000 | 2086400 | 0.286 | >48.20 |
| MRSA ATCC 43300 | 275600 | 50 | 3.741 | >99.98 |
| E. coli ATCC 8739 | 26828800 | 509600 | 1.721 | >98.00 |

Evaluating antimicrobial (AM) activity of P3 coated surfaces through multiple bacterial challenges: The antimicrobial efficacy (antibacterial) of P3 coated samples was tested against 3 bacterial strains using JIS Z 2801 protocol. For all of the strains AM evaluation was performed after 24 hours of contact time. The R-value represents the Log 10 of difference in total CFU count between control and the test surface. The % reduction shows a difference in total CFU count between control and test surface as a % of total CFU count of the control surface (Table 16).

TABLE 16

| Antibacterial efficacy of P3 coated samples | | | | |
| --- | --- | --- | --- | --- |
| | | #P3 coated samples | | |
| Strains tested | Control CFU | CFU | R | % microbial kill |
| P. aeruginosa ATCC 10145 | 4032000 | 0 | 6.605 | >99.99 |
| MRSA ATCC 43300 | 275600 | 0 | 5.440 | >99.99 |
| E. coli ATCC 8739 | 26828800 | 0 | 7.428 | >99.99 |

Headings are included herein for reference and to aid in locating certain sections. These headings are not intended to limit the scope of the concepts described therein, and these concepts may have applicability in other sections throughout the entire specification. Thus, the present invention is not intended to be limited to the embodiments shown herein but is to be accorded the widest scope consistent with the principles and novel features disclosed herein.

The singular forms "a", "an" and "the" include corresponding plural references unless the context clearly dictates otherwise. Thus, for example, reference to "a compound" includes one or more of such compounds and reference to "the method" includes reference to equivalent steps and methods known to those of ordinary skill in the art that could be modified or substituted for the methods described herein.

Unless otherwise indicated, all numbers expressing quantities of ingredients, reaction conditions, concentrations, properties, and so forth used in the specification and claims are to be understood as being modified in all instances by the term "about". At the very least, each numerical parameter should at least be construed in light of the number of reported significant digits and by applying ordinary rounding techniques. Accordingly, unless indicated to the contrary, the numerical parameters set forth in the present specification and attached claims are approximations that may vary depending upon the properties sought to be obtained. Notwithstanding that the numerical ranges and parameters setting forth the broad scope of the embodiments are approximations, the numerical values set forth in the specific examples are reported as precisely as possible. Any numerical value, however, inherently contains certain errors resulting from variations in experiments, testing measurements, statistical analyses and such.

It is understood that the examples and embodiments described herein are for illustrative purposes only and that various modifications or changes in light thereof will be suggested to persons skilled in the art and are to be included within the present invention and scope of the appended claims.

The invention claimed is:

1. A clear coating antimicrobial composition for conferring antimicrobial activity to a hard surface, comprising:
   at least one antimicrobial, wherein said least one antimicrobial comprises at least one quaternary ammonium compound, and wherein the composition comprises more than 1% w/w quaternary ammonium compound;
   a vinyl acetal derivative polymer binder;
   an organic solvent for solubilizing said at least one antimicrobial and said vinyl acetal derivative polymer binder; and
   a carrier;
      wherein said composition provides durable antimicrobial activity once applied on a hard surface.

2. The clear coating antimicrobial composition of claim 1, wherein said organic solvent is selected from the group consisting of polar protic solvent, dipolar aprotic solvent and mixtures thereof.

3. The clear coating antimicrobial composition of claim 2, wherein said polar protic solvent is selected from the group consisting of ethanol, n-butanol, methanol, propanol, isopropanol, acetic acid, diacetone alcohol and mixtures thereof.

4. The clear coating antimicrobial composition of claim 1, wherein said vinyl acetal derivative polymer binder is selected from the group derived from any aldehyde and polyvinyl alcohol consisting of poly(vinyl butyral) and poly(vinyl formal) and mixtures thereof.

5. The clear coating antimicrobial composition of claim 1, wherein the organic solvent comprises at least one alcohol.

6. The clear coating antimicrobial composition of claim 5, comprising at least 1% w/w alcohol, or at least 5% w/w alcohol, or at least 10% w/w alcohol, or at least 25% w/w alcohol, or at least 50% w/w alcohol, or at least 60% w/w alcohol, at least 70% w/w alcohol, or at least 75% w/w alcohol, or at least 80% w/w alcohol, or at least 85% w/w alcohol, or at least 90% w/w alcohol, or at least 95% w/w alcohol, or at least 98% w/w alcohol, based on the total weight of the composition.

7. The clear coating antimicrobial composition of claim 1, wherein said organic solvent comprises a mixture of ethanol and butanol.

8. The clear coating antimicrobial composition of claim 7, wherein said mixture of ethanol and butanol comprises about 70 w/w % to about 98 w/w % ethanol and about 30 w/w % to about 2 w/w % butanol, based on the total weight of the composition.

9. The clear coating antimicrobial composition of claim 1, wherein said organic solvent comprises a mixture of ethanol: diacetone alcohol or a mixture of isopropanol: diacetone alcohol.

10. The clear coating antimicrobial composition of claim 1, wherein said at least one antimicrobial is selected from the group consisting of quaternary ammonium compounds, metal ion-containing compounds, chelating agents, amino acid-based surfactants, antibiotics, compounds having a guanidine moiety, antifungal agents, antiviral agents and mixtures thereof.

11. The clear coating antimicrobial composition of claim 1, wherein the composition comprises 1.1% w/w to about 5% w/w quaternary ammonium compound, based on the total weight of the composition.

12. The clear coating antimicrobial composition of claim 1, wherein the carrier is selected from the group consisting of cellulose polymers, acrylic polymers, glycol polymers, polyvinyl alcohols, pyrrolidones and mixtures thereof.

13. The clear coating antimicrobial composition of claim 12, wherein the cellulose polymer is selected from the group consisting of hydroxypropyl methylcellulose (HPMC), hydroxypropyl cellulose (HPC), hydroxyethylcellulose (HEC), hydroxyethyl methyl cellulose (HEMC), methylcellulose (MC), sodium carboxymethyl cellulose (NaCMC), ethylcellulose (EC), and mixtures thereof.

14. The clear coating antimicrobial composition of claim 1, wherein the composition is comprised of 1% w/w to less than 5% w/w of the polymer binder, based on the total weight of the composition.

15. The clear coating antimicrobial composition of claim 1, wherein the composition is any one from Formulation as defined in the following table, wherein R represents the vinyl acetal derivative polymer binder polymer, $R_1$ represents the carrier $R_2$ represents antimicrobial(s), and $R_3$ represent the solvent(s):

| Particular examples of clear coating antimicrobial compositions comprising a vinyl acetal derivative polymer binder | | | | |
|---|---|---|---|---|
| Formulation Number | R* | $R_1$** | $R_2$*** | $R_3$ |
| 1 | PVB | EC | ADBAC | Ethanol:n-Butanol |
| 2 | PVB | EC | ADEBAC | Ethanol:n-Butanol |
| 3 | PVB | EC | ADBAC:ADEBAC | Ethanol:n-Butanol |
| 4 | PVB | EC | DDAC | Ethanol:n-Butanol |
| 5 | PVB | EC | DDAC:ADBAC | Ethanol:n-Butanol |
| 6 | PVB | EC | ADBAS | Ethanol:n-Butanol |
| 7 | PVB | EC | ADBAC:DDAC | Ethanol:n-Butanol |
| 8 | PVB | EC | ADBAC:ADBAS | Ethanol:n-Butanol |
| 9 | PVB | EC | ADEBAC:DDAC | Ethanol:n-Butanol |
| 10 | PVB | EC | ADEBAC:ADBAS | Ethanol:n-Butanol |
| 11 | PVB | EC | ADBAC:ADEBAC:DDAC | Ethanol:n-Butanol |
| 12 | PVB | EC | ADBAC:ADEBAC:DDAC:ADBAS | Ethanol:n-Butanol |
| 13 | PVB | EC | ADBAC:ODDAC:DODAC:DDDAC | Ethanol:n-Butanol |
| 14 | PVB | EC | BC | Ethanol:n-Butanol |
| 15 | PVB | EC | HTAC | Ethanol:n-Butanol |
| 16 | PVB | EC | DTAB | Ethanol:n-Butanol |
| 17 | PVB | EC | TTAB | Ethanol:n-Butanol |
| 21 | PVB | EC | ADBAC | 2-propanol:n-Butanol |
| 22 | PVB | EC | ADEBAC | 2-propanol:n-Butanol |
| 23 | PVB | EC | ADBAC:ADEBAC | 2-propanol:n-Butanol |
| 24 | PVB | EC | DDAC | 2-propanol:n-Butanol |
| 25 | PVB | EC | DDAC:ADBAC | 2-propanol:n-Butanol |
| 26 | PVB | EC | ADBAS | 2-propanol:n-Butanol |
| 26 | PVB | EC | ADBAC:DDAC | 2-propanol:n-Butanol |
| 27 | PVB | EC | ADBAC:ADBAS | 2-propanol:n-Butanol |
| 28 | PVB | EC | ADEBAC:DDAC | 2-propanol:n-Butanol |
| 29 | PVB | EC | ADEBAC:ADBAS | 2-propanol:n-Butanol |
| 30 | PVB | EC | ADBAC:ADEBAC:DDAC | 2-propanol:n-Butanol |
| 31 | PVB | EC | ADBAC:ADEBAC:DDAC:ADBAS | 2-propanol:n-Butanol |
| 32 | PVB | EC | ADBAC:ODDAC:DODAC:DDDAC | 2-propanol:n-Butanol |
| 33 | PVB | EC | BC | 2-propanol:n-Butanol |
| 34 | PVB | EC | HTAC | 2-propanol:n-Butanol |
| 35 | PVB | EC | DTAB | 2-propanol:n-Butanol |
| 36 | PVB | EC | TTAB | 2-propanol:n-Butanol |
| 40 | PVB | EC | ADBAC | Ethanol:Diacetone alcohol |
| 41 | PVB | EC | ADEBAC | Ethanol:Diacetone alcohol |
| 42 | PVB | EC | ADBAC:ADEBAC | Ethanol:Diacetone alcohol |
| 43 | PVB | EC | DDAC | Ethanol:Diacetone alcohol |
| 44 | PVB | EC | DDAC:ADBAC | Ethanol:Diacetone alcohol |
| 45 | PVB | EC | ADBAS | Ethanol:Diacetone alcohol |
| 46 | PVB | EC | ADBAC:DDAC | Ethanol:Diacetone alcohol |
| 47 | PVB | EC | ADBAC:ADBAS | Ethanol:Diacetone alcohol |

-continued

Particular examples of clear coating antimicrobial compositions
comprising a vinyl acetal derivative polymer binder

| Formulation Number | R* | R₁** | R₂*** | R₃ |
|---|---|---|---|---|
| 48 | PVB | EC | ADEBAC:DDAC | Ethanol:Diacetone alcohol |
| 49 | PVB | EC | ADEBAC:ADBAS | Ethanol:Diacetone alcohol |
| 50 | PVB | EC | ADBAC:ADEBAC:DDAC | Ethanol:Diacetone alcohol |
| 51 | PVB | EC | ADBAC:ADEBAC:DDAC:ADBAS | Ethanol:Diacetone alcohol |
| 52 | PVB | EC | ADBAC:ODDAC:DODAC:DDDAC | Ethanol:Diacetone alcohol |
| 53 | PVB | EC | BC | Ethanol:Diacetone alcohol |
| 54 | PVB | EC | HTAC | Ethanol:Diacetone alcohol |
| 55 | PVB | EC | DTAB | Ethanol:Diacetone alcohol |
| 56 | PVB | EC | TTAB | Ethanol:Diacetone alcohol |
| 60 | PVB | EC | ADBAC | 2-propanol:Diacetone alcohol |
| 61 | PVB | EC | ADEBAC | 2-propanol:Diacetone alcohol |
| 62 | PVB | EC | ADBAC:ADEBAC | 2-propanol:Diacetone alcohol |
| 63 | PVB | EC | DDAC | 2-propanol:Diacetone alcohol |
| 64 | PVB | EC | DDAC:ADBAC | 2-propanol:Diacetone alcohol |
| 65 | PVB | EC | ADBAS | 2-propanol:Diacetone alcohol |
| 66 | PVB | EC | ADBAC:DDAC | 2-propanol:Diacetone alcohol |
| 67 | PVB | EC | ADBAC:ADBAS | 2-propanol:Diacetone alcohol |
| 68 | PVB | EC | ADEBAC:DDAC | 2-propanol:Diacetone alcohol |
| 69 | PVB | EC | ADEBAC:ADBAS | 2-propanol:Diacetone alcohol |
| 70 | PVB | EC | ADBAC:ADEBAC:DDAC | 2-propanol:Diacetone alcohol |
| 71 | PVB | EC | ADBAC:ADEBAC:DDAC:ADBAS | 2-propanol:Diacetone alcohol |
| 72 | PVB | EC | ADBAC:ODDAC:DODAC:DDDAC | 2-propanol:Diacetone alcohol |
| 73 | PVB | EC | BC | 2-propanol:Diacetone alcohol |
| 74 | PVB | EC | HTAC | 2-propanol:Diacetone alcohol |
| 75 | PVB | EC | DTAB | 2-propanol:Diacetone alcohol |
| 76 | PVB | EC | TTAB | 2-propanol:Diacetone alcohol |
| 80 | PVB | EC | ADBAC | Ethanol |
| 81 | PVB | EC | ADEBAC | Ethanol |
| 82 | PVB | EC | ADBAC:ADEBAC | Ethanol |
| 83 | PVB | EC | DDAC | Ethanol |
| 84 | PVB | EC | DDAC:ADBAC | Ethanol |
| 85 | PVB | EC | ADBAS | Ethanol |
| 86 | PVB | EC | ADBAC:DDAC | Ethanol |
| 87 | PVB | EC | ADBAC:ADBAS | Ethanol |
| 88 | PVB | EC | ADEBAC:DDAC | Ethanol |
| 89 | PVB | EC | ADEBAC:ADBAS | Ethanol |
| 90 | PVB | EC | ADBAC:ADEBAC:DDAC | Ethanol |
| 91 | PVB | EC | ADBAC:ADEBAC:DDAC:ADBAS | Ethanol |
| 92 | PVB | EC | ADBAC:ODDAC:DODAC:DDDAC | Ethanol |
| 93 | PVB | EC | BC | Ethanol |
| 94 | PVB | EC | HTAC | Ethanol |
| 95 | PVB | EC | DTAB | Ethanol |
| 96 | PVB | EC | TTAB | Ethanol |
| 100 | PVB | EC | ADBAC | 2-propanol |
| 101 | PVB | EC | ADEBAC | 2-propanol |
| 102 | PVB | EC | ADBAC:ADEBAC | 2-propanol |
| 103 | PVB | EC | DDAC | 2-propanol |

-continued

Particular examples of clear coating antimicrobial compositions
comprising a vinyl acetal derivative polymer binder

| Formulation Number | R* | $R_1$** | $R_2$*** | $R_3$ |
|---|---|---|---|---|
| 104 | PVB | EC | DDAC:ADBAC | 2-propanol |
| 105 | PVB | EC | ADBAS | 2-propanol |
| 106 | PVB | EC | ADBAC:DDAC | 2-propanol |
| 107 | PVB | EC | ADBAC:ADBAS | 2-propanol |
| 108 | PVB | EC | ADEBAC:DDAC | 2-propanol |
| 109 | PVB | EC | ADEBAC:ADBAS | 2-propanol |
| 110 | PVB | EC | ADBAC:ADEBAC:DDAC | 2-propanol |
| 111 | PVB | EC | ADBAC:ADEBAC:DDAC:ADBAS | 2-propanol |
| 112 | PVB | EC | ADBAC:ODDAC:DODAC:DDDAC | 2-propanol |
| 113 | PVB | EC | BC | 2-propanol |
| 114 | PVB | EC | HTAC | 2-propanol |
| 115 | PVB | EC | DTAB | 2-propanol |
| 116 | PVB | EC | TTAB | 2-propanol |
| 120 | PVB | EC | ADBAC | n-Butanol |
| 121 | PVB | EC | ADEBAC | n-Butanol |
| 122 | PVB | EC | ADBAC:ADEBAC | n-Butanol |
| 123 | PVB | EC | DDAC | n-Butanol |
| 124 | PVB | EC | DDAC:ADBAC | n-Butanol |
| 125 | PVB | EC | ADBAS | n-Butanol |
| 126 | PVB | EC | ADBAC:DDAC | n-Butanol |
| 127 | PVB | EC | ADBAC:ADBAS | n-Butanol |
| 128 | PVB | EC | ADEBAC:DDAC | n-Butanol |
| 129 | PVB | EC | ADEBAC:ADBAS | n-Butanol |
| 130 | PVB | EC | ADBAC:ADEBAC:DDAC | n-Butanol |
| 131 | PVB | EC | ADBAC:ADEBAC:DDAC:ADBAS | n-Butanol |
| 132 | PVB | EC | ADBAC:ODDAC:DODAC:DDDAC | n-Butanol |
| 133 | PVB | EC | BC | n-Butanol |
| 134 | PVB | EC | HTAC | n-Butanol |
| 135 | PVB | EC | DTAB | n-Butanol |
| 136 | PVB | EC | TTAB | n-Butanol |
| 140 | PVB | EC | ADBAC | Diacetone alcohol |
| 141 | PVB | EC | ADEBAC | Diacetone alcohol |
| 142 | PVB | EC | ADBAC:ADEBAC | Diacetone alcohol |
| 143 | PVB | EC | DDAC | Diacetone alcohol |
| 144 | PVB | EC | DDAC:ADBAC | Diacetone alcohol |
| 145 | PVB | EC | ADBAS | Diacetone alcohol |
| 146 | PVB | EC | ADBAC:DDAC | Diacetone alcohol |
| 147 | PVB | EC | ADBAC:ADBAS | Diacetone alcohol |
| 147 | PVB | EC | ADEBAC:DDAC | Diacetone alcohol |
| 148 | PVB | EC | ADEBAC:ADBAS | Diacetone alcohol |
| 149 | PVB | EC | ADBAC:ADEBAC:DDAC | Diacetone alcohol |
| 150 | PVB | EC | ADBAC:ADEBAC:DDAC:ADBAS | Diacetone alcohol |
| 151 | PVB | EC | ADBAC:ODDAC:DODAC:DDDAC | Diacetone alcohol |
| 152 | PVB | EC | BC | Diacetone alcohol |
| 153 | PVB | EC | HTAC | Diacetone alcohol |
| 154 | PVB | EC | DTAB | Diacetone alcohol |
| 155 | PVB | EC | TTAB | Diacetone alcohol |

*PVB = Polyvinylbutyral;

**EC = Ethyl cellulose;

***ADBAC = N-alkyl dimethyl benzyl ammonium chloride; ADEBAC = N-alkyl dimethyl ethylbenzyl ammonium chloride; DDAC = Didecyl dimethyl ammonium chloride; ADBAS = N-alkyl dimethyl benzyl ammonium saccharinate; ODDAC = Octyl decyl dimethyl ammonium chloride; DODAC = Dooctyl dimethyl ammonium chloride; DDDAC = Didecyl dimethyl ammonium chloride; BC = Benzethonium chloride; HTAC = Hexadecyl trimethyl ammonium chloride; DTAB = Decyl trimethyl ammonium bromide; TTAB = Tetra trimethyl ammonium bromide.

16. The clear coating antimicrobial composition of claim 1, further comprising an additive, wherein the additive enhances any of the following properties of the composition or final coating derived therefrom: preservation properties, mechanical properties, thermal properties, electrical properties, barrier properties, rheology properties, scavenging properties, exfoliation properties, fire-retardant properties, permeability properties, surfactant properties, rust-proofing properties, olfactive properties, wetting properties, drying properties, adhesion properties and levelling properties.

17. The clear coating antimicrobial composition of claim 1, wherein the composition consists essentially of polyvinyl butyral (PVB), ethylcellulose and quaternary ammonium(s) dispersed into ethanol and n-butanol.

18. The clear coating antimicrobial composition of claim 1, wherein the composition consists essentially of polyvinyl butyral (PVB), ethylcellulose and N-alkyl dimethyl benzyl ammonium chloride (ADBAC) dispersed in ethanol and butanol.

19. A clear coating antimicrobial composition for conferring antimicrobial activity to a hard surface, comprising:
(i) N-alkyl dimethyl benzyl ammonium chloride (ADBAC);
(ii) polyvinylbutyral (PVB);
(iii) a carrier;
(iv) a solvent for solubilizing said (i) and (ii), wherein said solvent comprises a mixture of ethanol and butanol; and
(v) ethylcellulose (EC).

43

20. An article of manufacture comprising the clear coating antimicrobial composition as defined in claim 1, wherein said article is selected from the group consisting of plastics, polymers, steel, glass, wood, ceramic, concrete, walls, paper, cellulose, foams, fibers, filters, and leather.

21. A method for conferring antimicrobial activity to a hard surface, comprising contacting said surface with the clear coating antimicrobial composition as defined in claim 1.

22. The method of claim 21, comprising spraying or brushing the hard surface with said clear coating antimicrobial composition, and wherein said hard surface is selected from the group consisting of furniture, partition curtains, handrails, doors, doorknobs, medical equipment, walls, floors, elevators, air vents, air filters.

23. The clear coating antimicrobial composition of claim 1, wherein the at least one quaternary ammonium compound is selected from the group consisting of: akyl dimethyl benzyl ammonium chloride (ADBAC), didecyl dimethyl ammonium chloride (DDAC), benzyldimethyl(2-dodecyloxyethyl)-ammonium chloride, benzyldimethyl(2-hydroxyethyl)ammonium chloride, benzyldimethyl (hexadecylcarbamoylmethyl)ammonium chloride, benzyldimethyl (tetradecylcarboamoylmethyl)ammonium chloride, benzyloxycarbonylmethyl-trimethylammonium chloride, bis-(2-hydroxyethyl)-ciannamyl(2-dodecyloxymethyl)ammonium chloride, benzyltriethylammonium chloride, tetramethylammonium chloride, tetramethylammonium iodide, tetraethylammonium hydroxide, tetramethylammonium hydroxide, benzyltrimethylammonium hydroxide, dimethyldioctadecylammonium chloride, dodecyltrimethylammonium choride, trimethylphenylammonium chloride, octadecyltrimethyl ammonium bromide, tetrabutyl ammonium bromide, tetramethylammonium nitrate, tetrabutylammonium hydroxide, didodecyldimethyl ammonium bromide, didodecyldimethylammonium chloride, dimethyldioctadecyl ammonium bromide, (2-(methacryloyloxy)ethyl)trimethylammonium chloride, dioctyl dimethyl ammonium chloride, tetrapropylammonium chloride, didecyldimethylammonium chloride, bezyldodecyldimethyl ammonium bromide, diallyl dimethyl ammonium chloride, benzalkonium bromide, ammonium bromide, benzyltributylammonium chloride, octyldecyl dimethyl ammonium chloride, tetrabutylammonium hydrogen sulfate, tetrabutylammonium tribromide, methyltributylammonium chloride, bis(hydrogenated tallow)dimethylammonium chloride, N-alkyldimethyl benzyl ammonium chloride, and tetrabutylammonium fluoride trihydrate and mixtures thereof.

24. A clear coating antimicrobial composition for conferring antimicrobial activity to a hard surface, comprising:
   at least one antimicrobial, wherein said least one antimicrobial comprises at least one quaternary ammonium compound;
   a vinyl acetal derivative polymer binder;
   an organic solvent for solubilizing said at least one antimicrobial and said vinyl acetal derivative polymer binder; and
   a carrier;
      wherein the at least one quaternary ammonium compound is selected from the group consisting of: akyl dimethyl benzyl ammonium chloride (ADBAC), didecyl dimethyl ammonium chloride (DDAC), benzyldimethyl(2-dodecyloxyethyl)-ammonium chloride, benzyldimethyl(2-hydroxyethyl)ammonium chloride, benzyldimethyl (hexadecylcarbamoylmethyl)ammonium chloride, benzyldimethyl (tetradecylcarboamoylmethyl)ammonium chloride, benzyloxycarbonylmethyl-trimethylammonium chloride, bis-(2-hydroxyethyl)-ciannamyl(2-dodecyloxymethyl)ammonium chloride, benzyltriethylammonium chloride, tetramethylammonium chloride, tetramethylammonium iodide, tetraethylammonium hydroxide, tetramethylammonium hydroxide, benzyltrimethylammonium hydroxide, dimethyldioctadecylammonium chloride, dodecyltrimethylammonium choride, trimethylphenylammonium chloride, octadecyltrimethyl ammonium bromide, tetrabutyl ammonium bromide, tetramethylammonium nitrate, tetrabutylammonium hydroxide, didodecyldimethyl ammonium bromide, didodecyldimethylammonium chloride, dimethyldioctadecyl ammonium bromide, (2-(methacryloyloxy)ethyl)trimethylammonium chloride, dioctyl dimethyl ammonium chloride, tetrapropylammonium chloride, didecyldimethylammonium chloride, bezyldodecyldimethyl ammonium bromide, diallyl dimethyl ammonium chloride, benzalkonium bromide, ammonium bromide, benzyltributylammonium chloride, octyldecyl dimethyl ammonium chloride, tetrabutylammonium hydrogen sulfate, tetrabutylammonium tribromide, methyltributylammonium chloride, bis(hydrogenated tallow)dimethylammonium chloride, N-alkyldimethyl benzyl ammonium chloride, and tetrabutylammonium fluoride trihydrate and mixtures thereof; and
   wherein said composition provides durable antimicrobial activity once applied on a hard surface.

* * * * *